(12) United States Patent
Yewchin et al.

(10) Patent No.: US 11,741,252 B1
(45) Date of Patent: Aug. 29, 2023

(54) PARALLEL AND INCREMENTAL PROCESSING TECHNIQUES FOR DATA PROTECTION

(71) Applicant: SAS Institute Inc., Cary, NC (US)

(72) Inventors: Darryl Edward Yewchin, Fountain Hills, AZ (US); Robert Todd Foreman, Raleigh, NC (US); Robert Valentine Rood, Sacramento, CA (US)

(73) Assignee: SAS Institute, Inc., Cary, NC (US)

( * ) Notice: Subject to any disclaimer, the term of this patent is extended or adjusted under 35 U.S.C. 154(b) by 0 days.

(21) Appl. No.: 18/172,614

(22) Filed: Feb. 22, 2023

Related U.S. Application Data

(60) Provisional application No. 63/398,748, filed on Aug. 17, 2022, provisional application No. 63/359,177, filed on Jul. 7, 2022.

(51) Int. Cl.
*G06F 21/56* (2013.01)
*G06F 21/60* (2013.01)
*G06F 21/62* (2013.01)

(52) U.S. Cl.
CPC ........ *G06F 21/6227* (2013.01); *G06F 21/565* (2013.01); *G06F 21/604* (2013.01)

(58) Field of Classification Search
CPC .......... G06F 21/56; G06F 21/60; G06F 21/62; G06F 21/6227; G06F 21/565; G06F 21/604
See application file for complete search history.

(56) References Cited

U.S. PATENT DOCUMENTS

| | | | |
|---|---|---|---|
| 7,676,478 | B2 | 3/2010 | Rausch |
| 8,661,065 | B2 | 2/2014 | Rausch et al. |
| 9,223,619 | B2 | 12/2015 | Rausch et al. |
| 9,569,263 | B2 | 2/2017 | Rausch et al. |
| 9,753,767 | B2 | 9/2017 | Rausch et al. |
| 10,261,837 | B2 | 4/2019 | Chen et al. |
| 10,310,896 | B1 | 6/2019 | Kichak et al. |
| 10,459,849 | B1 | 10/2019 | Shorb et al. |
| 10,552,739 | B1 | 2/2020 | Rausch et al. |
| 11,106,694 | B1 | 8/2021 | Cox et al. |
| 11,341,414 | B2 * | 5/2022 | Rausch ................. G06N 3/084 |
| 2014/0280239 | A1 | 9/2014 | Georges et al. |

FOREIGN PATENT DOCUMENTS

| | | | | |
|---|---|---|---|---|
| CA | 3108525 A1 | * | 2/2020 | ............. G06F 17/18 |
| CA | 3109748 A1 | * | 2/2020 | ............. G06F 21/32 |
| CN | 108563961 A | * | 9/2018 | ......... G06F 21/6245 |
| CN | 111860638 A | * | 10/2020 | ........... G06F 21/566 |
| CN | 110611635 B | * | 2/2022 | ......... H04L 63/1416 |

* cited by examiner

*Primary Examiner* — Jayesh M Jhaveri
(74) *Attorney, Agent, or Firm* — Kilpatrick Townsend & Stockton LLP

(57) ABSTRACT

A data protection system is provided to detect data and execute security actions on the detected data using multiple tiers of parallel processing and incremental processing. For example, the data protection system can employ parallel job-submission and parallel-job execution to cataloging, scanning, searching, and other processes. Only source data that has not already been processed or has modified may be loaded to a cataloging data queue and a scanning data queue to reduce processing time. Scan results can include different data groups and can be used to search for specific data sets.

30 Claims, 24 Drawing Sheets

1702 —
```
select into :c_column_sk1 - :c_column_sk&c_column_count.,
           :c_column_name 1- :c_column_name&c_column_count.
where column_type='CHAR' select into :n_column_sk1 - :n_column_sk&n_column_count.,
           :n_column_name1- :n_column_name&n_column_count.
where column_type='NUM'
```

1704 —
```
%do i = 1 %to &c_column_count.;
   call symput("c_column&i.",cats('C',"&&c_column_sk&i."));
%end;

%do i = 1 %to &n_column_count.;
   call symput("n_column&i.",cats('N',,"&&n_column_sk&i."));
%end;
```

1706 —
```
C/* Create Column Value Array */
array valc (&c_column_count) $1000 &c_column1. v-&&c_column_&c_column_count_v;
array valn (&n_column_count) &n_column1. v-&&n_column_&c_column_count._v;

/* Create Column Name Array */ array varc (&c_column_count) c_column_name1-c_column_name&c_column_count;
array varn (&n_column_count) n_column_name1-n_column_name&n_column_count;

/* Categorize and Store Formatted (vvalue) Values */ do c = 1 to &c_column_count;
 valc(c) = vvalue(varc(c));
 dqcatc(c)=dqidentify(vvalue(varc(c)),"&_qkb_definition_");
end;

do c = 1 to &c_column_count;
 valn(n) = vvalue(varc(n));
 dqcatn(n)=dqidentify(vvalue(varc(n)),"&_qkb_definition_");
end;

/* Create Column Categorization Array */ array dqcatc (&c_column_count) $25 &c_column1. c-&&c_column_&c_column_count. c;
array dqcatn (&n_column_count) $25 &c_column1. c-&&n_column_&c_column_count. c;
```

```
┌─────────────────────────────────────────────────────────────────┐
│   DETERMINE THAT DATA VALUES IN A COLUMN OF THE SAMPLE DATA ARE │
│          OF A FIRST TYPE BASED ON A NAME OF THE COLUMN          │
│                              2402                               │
└─────────────────────────────────────────────────────────────────┘
                                 │
                                 ▼
┌─────────────────────────────────────────────────────────────────┐
│  DETERMINE THAT THE DATA VALUES IN THE COLUMN ARE OF A SECOND   │
│   TYPE BY ANALYZING THE DATA VALUES, THE SECOND TYPE BEING      │
│                DIFFERENT FROM THE FIRST TYPE                    │
│                              2404                               │
└─────────────────────────────────────────────────────────────────┘
                                 │
                                 ▼
┌─────────────────────────────────────────────────────────────────┐
│      DETERMINE A CONFLICT BETWEEN THE FIRST TYPE AND THE SECOND TYPE │
│                              2406                               │
└─────────────────────────────────────────────────────────────────┘
                                 │
                                 ▼
┌─────────────────────────────────────────────────────────────────┐
│   EXECUTE AN OPERATION CONFIGURED TO RESOLVE THE CONFLICT BY    │
│  SELECTING THE FIRST TYPE OR THE SECOND TYPE AS A GROUP TYPE FOR │
│                 THE COLUMN OF THE SAMPLE DATA                   │
│                              2408                               │
└─────────────────────────────────────────────────────────────────┘
                                 │
                                 ▼
┌─────────────────────────────────────────────────────────────────┐
│   DETERMINE THE DATA VALUES IN THE COLUMN ARE OF A THIRD TYPE BY │
│                  USING A MOD 10 ALGORITHM                       │
│                              2410                               │
└─────────────────────────────────────────────────────────────────┘
                                 │
                                 ▼
┌─────────────────────────────────────────────────────────────────┐
│     DETERMINE ANOTHER CONFLICT BETWEEN THE THIRD TYPE AND THE   │
│                           GROUP TYPE                            │
│                              2412                               │
└─────────────────────────────────────────────────────────────────┘
                                 │
                                 ▼
┌─────────────────────────────────────────────────────────────────┐
│  EXECUTE ANOTHER OPERATION CONFIGURED TO RESOLVE THE OTHER      │
│  CONFLICT BY SELECTING THE THIRD TYPE AS AN UPDATE GROUP TYPE FOR │
│                 THE COLUMN OF THE SAMPLE DATA                   │
│                              2414                               │
└─────────────────────────────────────────────────────────────────┘
```

FIG. 24

PARALLEL AND INCREMENTAL PROCESSING TECHNIQUES FOR DATA PROTECTION

REFERENCE TO RELATED APPLICATION

This claims the benefit of priority under 35 U.S.C. § 119(e) to U.S. Provisional Patent Application No. 63/359,177, filed Jul. 7, 2022, and to U.S. Provisional Patent Application No. 63/398,748, filed Aug. 17, 2022, the entirety of each of which is hereby incorporated by reference herein.

TECHNICAL FIELD

The present disclosure relates generally to data processing. More specifically, but not by way of limitation, this disclosure relates to parallel and incremental processing techniques for data protection.

BACKGROUND

Modern internet and digital communications can generate, collect, and store large volumes of data. For example, a cloud-based application installed on a mobile device can constantly collect usage data, location data, and event data from other applications, and transmit these data to a cloud platform. The owner of the cloud-based application can be a data controller. The cloud platform can be a data processor. In certain situations, entities, such as data controllers or data processors, are required to identify certain data, such as personal identifiable information, upon request from a data subject. These entities are also required to employ security measures to protect personal identifiable information (PII).

SUMMARY

One example of the present disclosure includes a system having one or more processors and one or more memory devices including instructions that are executable by the one or more processors for causing the one or more processors to perform operations. The operations can include extracting metadata for a directory of files. The operations can include loading the directory of files to be scanned into a scanning data queue. The operations can include executing a control loop configured to generate a configurable number of scanning-job-submission services. The configurable number can be based on a runtime parameter associated with the control loop. Each scanning-job-submission service can be configured to retrieve a respective subset of files from the scanning data queue and generate a respective set of scanning jobs for scanning the respective subset of files. The operations can include deploying the configurable number of scanning-job-submission services in parallel in a computing environment. Each scanning-job-submission service can be configured to execute a respective child loop for submitting the respective set of scanning jobs to a job scheduler for parallel execution. The job scheduler can be configured to orchestrate the parallel execution of the respective set of scanning jobs across one or more worker nodes of the computing environment. Each scanning job can be configured to scan a particular file of the respective subset of files retrieved by a corresponding scanning-job-submission service for detecting target data. Each scanning job can retrieve a subset of the metadata corresponding to the particular file to be scanned; determine a sample size based on the subset of the metadata corresponding to the particular file, the sample size being an amount of data to be extracted from the particular file and scanned for detecting the target data; extract sample data of the sample size from the particular file; scan the sample data for detecting the target data to generate scan results; store the sample data and the scan results; and flag the target data in the particular file in response to detecting the target data in the sample data.

Another example of the present disclosure can include a method. The method can include extracting metadata for a directory of files. The method can include loading the directory of files to be scanned into a scanning data queue. The method can include executing a control loop configured to generate a configurable number of scanning-job-submission services. The configurable number can be based on a runtime parameter associated with the control loop. Each scanning-job-submission service can be configured to retrieve a respective subset of files from the scanning data queue and generate a respective set of scanning jobs for scanning the respective subset of files. The method can include deploying the configurable number of scanning-job-submission services in parallel in a computing environment. Each scanning-job-submission service can be configured to execute a respective child loop for submitting the respective set of scanning jobs to a job scheduler for parallel execution. The job scheduler can be configured to orchestrate the parallel execution of the respective set of scanning jobs across one or more worker nodes of the computing environment. Each scanning job can be configured to scan a particular file of the respective subset of files retrieved by a corresponding scanning-job-submission service for detecting target data. Each scanning job can retrieve a subset of the metadata corresponding to the particular file to be scanned; determine a sample size based on the subset of the metadata corresponding to the particular file, the sample size being an amount of data to be extracted from the particular file and scanned for detecting the target data; extract sample data of the sample size from the particular file; scan the sample data for detecting the target data to generate scan results; store the sample data and the scan results; and flag the target data in the particular file in response to detecting the target data in the sample data.

Yet another example of the present disclosure can include a non-transitory computer-readable medium comprising program code that is executable by one or more processors for causing the processor to perform operations. The operations can include extracting metadata for a directory of files. The operations can include loading the directory of files to be scanned into a scanning data queue. The operations can include executing a control loop configured to generate a configurable number of scanning-job-submission services. The configurable number can be based on a runtime parameter associated with the control loop. Each scanning-job-submission service can be configured to retrieve a respective subset of files from the scanning data queue and generate a respective set of scanning jobs for scanning the respective subset of files. The operations can include deploying the configurable number of scanning-job-submission services in parallel in a computing environment. Each scanning-job-submission service can be configured to execute a respective child loop for submitting the respective set of scanning jobs to a job scheduler for parallel execution. The job scheduler can be configured to orchestrate the parallel execution of the respective set of scanning jobs across one or more worker nodes of the computing environment. Each scanning job can be configured to scan a particular file of the respective subset of files retrieved by a corresponding scanning-job-submission service for detecting target data. Each scanning job can retrieve a subset of the metadata corresponding to the particular file to be scanned; determine a sample size based on the subset of the metadata corresponding to the particular file, the sample size being an amount of data to be extracted from the particular file and scanned for detecting the target data; extract sample data of the sample size from the particular file; scan the sample data for detecting the target data to generate scan results; store the sample data and the scan results; and flag the target data in the particular file in response to detecting the target data in the sample data.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 17 illustrates example code blocks of a code generation module for generating scan code for scanning a particular file, according to some aspects.

FIG. 24 is a flow chart of an example process for determining a group type for a column of the sample data, according to some aspects.

Figure 1:
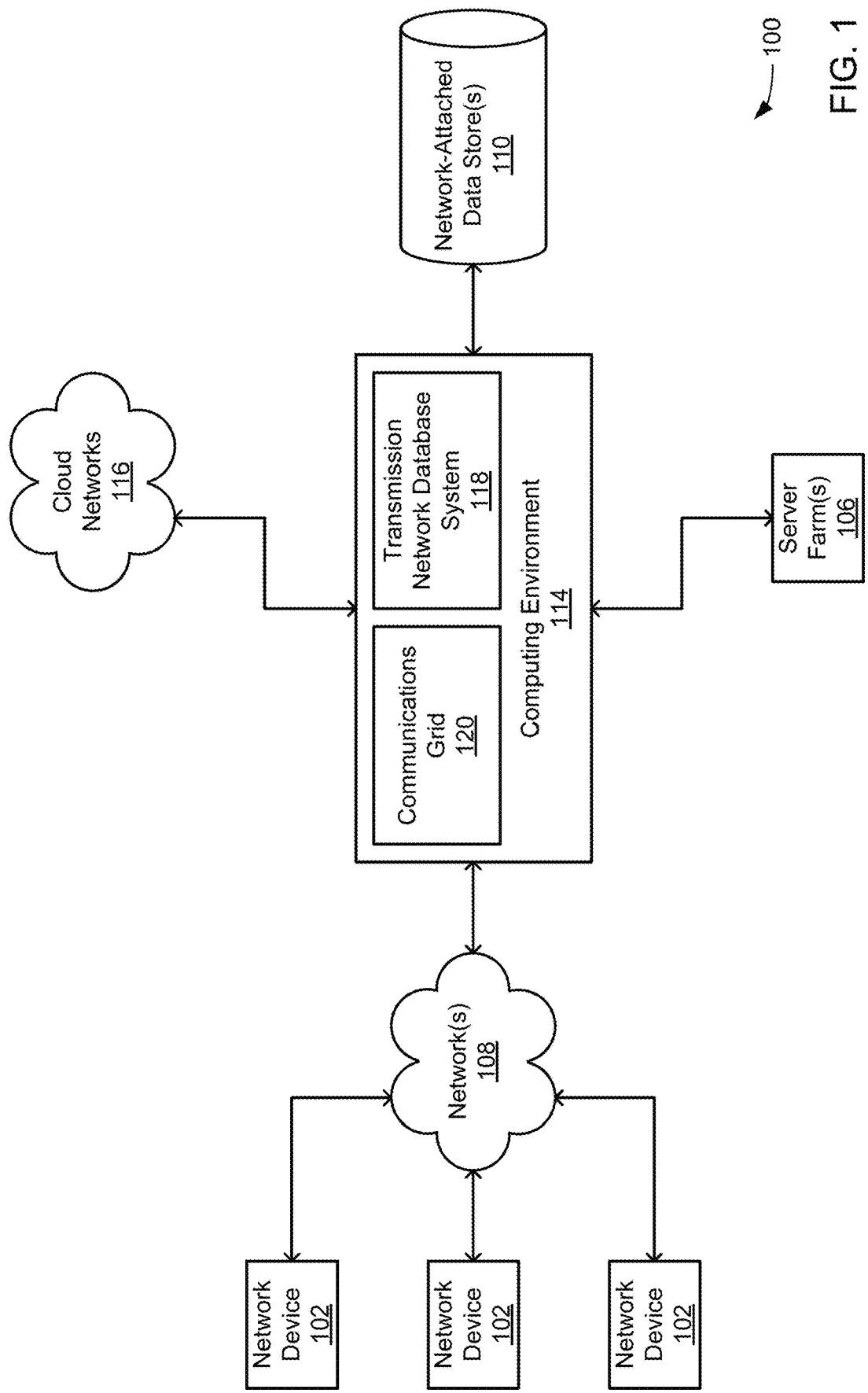
FIG. 1 is a block diagram that provides an illustration of the hardware components of a data transmission network, according to embodiments of the present technology.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Many cloud applications and platforms collect and store large volumes of data. Some data, such as personal identifiable information (PII), may raise security concerns when not stored or secured properly. But it can be challenging to rapidly identify these data from a set of source data and take relevant security actions. For example, to identify certain types of target data, entities, such as a data processor or a data controller, may need to process hundreds of terabytes or petabytes of data. But using existing approaches, this large amount of data can be slow to process and may require significant amounts of processing power and memory to do so.

Certain aspects and features of the present disclosure can solve one or more of the abovementioned problems by providing a data protection system that can automatically and rapidly catalog, scan, and categorize the source data using multiple tiers of parallel computing. The data protection system can also execute security actions with respect to certain types of data identified by the scanning process, for example to prevent the accidental disclosure of sensitive information. The data protection system can further provide expedited techniques for searching through the source data.

To achieve these enhancements, the data protection system can employ parallel job-submission and parallel job-execution, as will be described in more detail later on. But in general, this multi-tier parallel processing framework can be applied to the cataloging process, scanning process, searching process, and other processes.

For parallel job-submission, a control loop can spawn a configurable number of child loops based on a computing capacity of a computing environment, where each child loop can retrieve a selected subset of jobs from an overall group of jobs and submit their selected subset of jobs to worker nodes in the computing environment for execution. The child loops can execute in parallel to one another so that they concurrently submit jobs to the worker nodes, which can help ensure that the worker nodes are operating at maximum efficiency and avoid latency (e.g., time for checking submissions, time for submitting, and time for initiating execution) that may occur with sequential job submissions. The worker nodes can receive the jobs from the child loops and execute the jobs in parallel to one another, which provides another tier of parallelism. Thus, both job submission and job execution may be performed using parallel processing. In some examples, jobs submitted from each child loop are distributed across all available worker nodes by the child loops, so that the child loops are not tethered to any particular worker nodes and all worker nodes are load balanced. This may allow for enhanced flexibility, so that as worker nodes go offline or come online, or as worker nodes' workloads change over time, the child loops can continue to submit jobs to the available worker nodes. These two tiers of parallelism (parallel job-submission and parallel job-execution) can be employed at some or all stages implemented by the data protection system. In some examples, the data protection system needs to process millions of datasets/files on a distributed file system, which may include both small files and much larger files to be processed. These two tiers of parallelism can be employed during the cataloging, scanning, and/or searching stages to expedite each stage of the process. For example, scanning jobs in a first child loop are for scanning small files, and scanning jobs in a second child loop are for scanning much larger files. When the two child loops submit their respective scanning jobs in parallel, the scanning jobs for scanning the small files from the first child loop are submitted to a first group of worker nodes for execution, and a second group of worker nodes are used for executing the scanning jobs for scanning the much larger files from the second child loop. When completing execution of the scanning jobs for scanning the small files, the first group of worker nodes may become available to receive job submissions from the second child loop and execute scanning jobs for scanning the much larger files. This way, the workload for each worker node can be balanced dynamically and the total processing time can be reduced.

The data protection system can also provide incremental processing, such as incremental cataloging and incremental scanning. For example, a cataloging data queue can include a limited set of directories that have either not been processed for extracting metadata or have changed since last cataloging. Also, a scanning data queue can be loaded with a limited set of files that have either not been scanned or have changed since last scanned. This minimizes the number of jobs that need to be executed and shortens the overall execution time of the end-to-end cataloging and scanning process.

As one particular example, the data protection system can extract metadata about certain source data, such as a directory of files that has not been processed, stored on the data source in a cataloging process. The directory of files can then be loaded into a scanning data queue, which can be a queue for storing files to be scanned. The data protection system includes a control loop for scanning-job submissions. The control loop can be configured to deploy multiple scanning-job-submission services in parallel, where the number of parallel scanning-job-submission services deployed is configurable based on a runtime parameter associated with the control loop. Each parallel scanning-job-submission service can retrieve one or more files from the scanning data queue and create a respective number of scanning jobs for use in scanning the retrieved files. Each scanning job is configured to scan one or more of the retrieved files. Once deployed, each scanning-job-submission service is configured to submit its respective number of scanning jobs in parallel to a job scheduler. Submitting the scanning jobs in parallel to the job scheduler may serve as a first tier of parallelism in the system. The job scheduler can then schedule the scanning jobs for execution in parallel, which can serve as a second tier of parallelism in the system.

In some examples, multiple tiers of parallelism can also be applied to the cataloguing process. For example, multiple directories of files can be processed in parallel to extract metadata about each directory of files. In some such examples, multiple directories of files can be loaded to a cataloging data queue, which can be a queue for storing directories of files to be cataloged. A control loop for cataloging-job submissions can deploy multiple cataloging-job-submission services in parallel, where the number of parallel cataloging-job-submission services generated can be configurable based on a runtime parameter associated with the control loop. Each cataloging-job-submission service can retrieve one or more directories of files for cataloging and create a number of cataloging jobs for the retrieved directories of files. The number of cataloging jobs can depend on the number of directories that are retrieved. Each cataloging-job-submission service can submit the number of cataloging jobs to a job scheduler. Submitting the cataloging jobs in parallel to the job scheduler may serve as a first tier of parallelism in the system. The job scheduler can then schedule the cataloging jobs for execution in parallel, which can serve as a second tier of parallelism in the system. A data catalog can be created to store the extracted metadata about each directory of files. In some examples, these data cataloging operations may occur prior to the data scanning operations described above to help facilitate and expedite the data scanning operations.

A modulo (mod) algorithm can be used to evenly distribute data to parallel job-submission services. For example, each parallel cataloging-job-submission service can select a number of directories of files from the cataloging data queue based on the mod algorithm to evenly distribute the directories in the cataloging data queue amongst the configurable number of cataloging-job-submission services. As another example, each parallel scanning-job-submission service can select a number of files from the scanning data queue to be scanned based on a mod algorithm to evenly distribute the files in the scanning data queue amongst the configurable number of scanning-job-submission services.

In some examples, each scanning job can determine a sample size based on the metadata about a particular file designated for each scanning job, extract sample data of the sample size from the particular file, and scan the sample data for detecting target data, like personally identifiable information. If the scanning job identifies the target data in the sample data, the scanning job can flag the particular file as containing the target data. Each scanning job may only scan the sample data, rather than the entirety of the particular file. Scanning the entirety of each file in a directory of files can be time consuming and resource intensive. The sample size can be determined using a statistical sampling algorithm. The data protection system can adjust one or more parameters of a sampling algorithm based on the metadata of the particular file and determine the sample size based on the one or more adjusted parameters. The one or more parameters can be adjusted to achieve an accuracy level while reducing scanning time. The scanning job then extracts the amount of data corresponding to the sample size from the particular file to create sample data for scanning.

In some examples, the data protection system can dynamically generate the program code for the scanning jobs. This program code may be referred to herein as scan code. To create the scan code, the data protection system can start with a code template and modify aspects of the code template based on the scanning task. For instance, the code template may include a plurality of macro variables or fields that can be adjusted based on the scanning task. In some examples, each column of the sample data to be scanned can be assigned to a key value. The key values may then be used as values for macro variables for specific columns to replace the macro-variables in the code template to produce executable scan code.

To help facilitate the scanning process, in some examples the data protection system may perform a categorization process. During the categorization process, the sample data can be categorized into different group types. This may occur in parallel to an ongoing scanning process. To determine a group type for a column of the sample data, the data protection system can determine a first type based on a name of the column and a second type based on the data values in the column. If the first type and the second type are in conflict (e.g. the first type and the second type are different types), the data protection server can apply an operation to resolve the conflict by selecting the first type or the second type as a group type. The operation is usually a preprogrammed logic process. For some types of data (e.g., personal identification numbers), the data protection system also determines a third type by applying a mod-10 algorithm (e.g., Luhn algorithm) to the data values in the column. If there is a conflict between the third type and the previously selected group type, the data protection system can apply another operation to resolve the conflict. In some examples, the operation may prioritize the third type over any previously selected group types, and thus may select the third type as the final group type over any previously selected group type. Group definitions are configurable based on taxonomies of the source data.

In some examples, users or devices may submit search queries to the data protection system, which can search different data groups in the scan results based on the search criteria in the search request. Candidate groups that may contain data satisfying the search criteria may be selected for searching, while other groups are excluded from searching. For example, the user may submit a search query to identify files that include a certain address. Having performed the prior categorization and scanning processes, the data protection system may know which columns of data in the files are most likely to contain address information. So, the data protection system may search only those columns of interest (e.g., rather than searching all columns in the files). This can significantly expedite the searching process and save time and valuable computing resources, by limiting the search space and avoiding searching through data columns that are unlikely to contain the desired information. Performing the prior categorization and scanning process can also improve the accuracy of the subsequent searching phase as compared to other approaches, such as simply searching the predefined columns of a database table. This is because the actual content in the database columns may not necessarily align with the column names, so searching those database columns may not yield the desired results. In some examples, candidate tables containing the columns of interest are loaded to a searching data queue, which is a queue for storing data to be searched. Similar to cataloging and scanning, a number of parallel searching-job-submission services can be generated to retrieve a number of candidate tables and create a number of searching jobs for the number of candidate tables. Each parallel searching-job-submission service can be deployed in parallel and, in turn, can submit searching jobs to a job scheduler for execution in parallel.

In some examples, the data protection system can classify the scanned and grouped data based on their sensitivity (e.g., their confidentiality). If the data protection system determines that certain files include sensitive information and are not already adequately protected, the data protection system can execute one or more security action to increase a security level associated with the files. Examples of the security actions can include moving a data file to a restricted folder, changing access controls to the data file, deleting the data file, and deleting column data containing sensitive values from the data file.

In some examples, entities, such as data processors or controllers, may need to process large amounts of data, and execute security actions on certain types of data, such as personal identifiable information (PII), to comply with certain data privacy laws and regulations. PII can include any information that can be used to distinguish or trace an individual's identity, such as names, personal identification numbers, personal address information, personal telephone numbers, biometric data, information identifying personally owned property, and asset information. For example, those entities may need to identify users and provide them with their user data to comply with a Right to Know provision. Those entities may also need to search and erase data files per a Right to Be Forgotten regulation. In addition, those entities may need to report on impacted data files and remediation steps based on data classification. The data protection system in this disclosure provides a streamlined process for cataloging, scanning, and grouping their large amounts of data with parallel processing to generate organized data, such as data catalogs and scan results. The organized data, including different data groups in the scan results, can be used for searching for specific data sets and executing security actions on certain data based on sensitivity level.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-13 depict examples of systems and methods usable in connection with accessing, identifying, and protecting personal identifiable information, according to some aspects.

Now referring to FIG. 1, FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
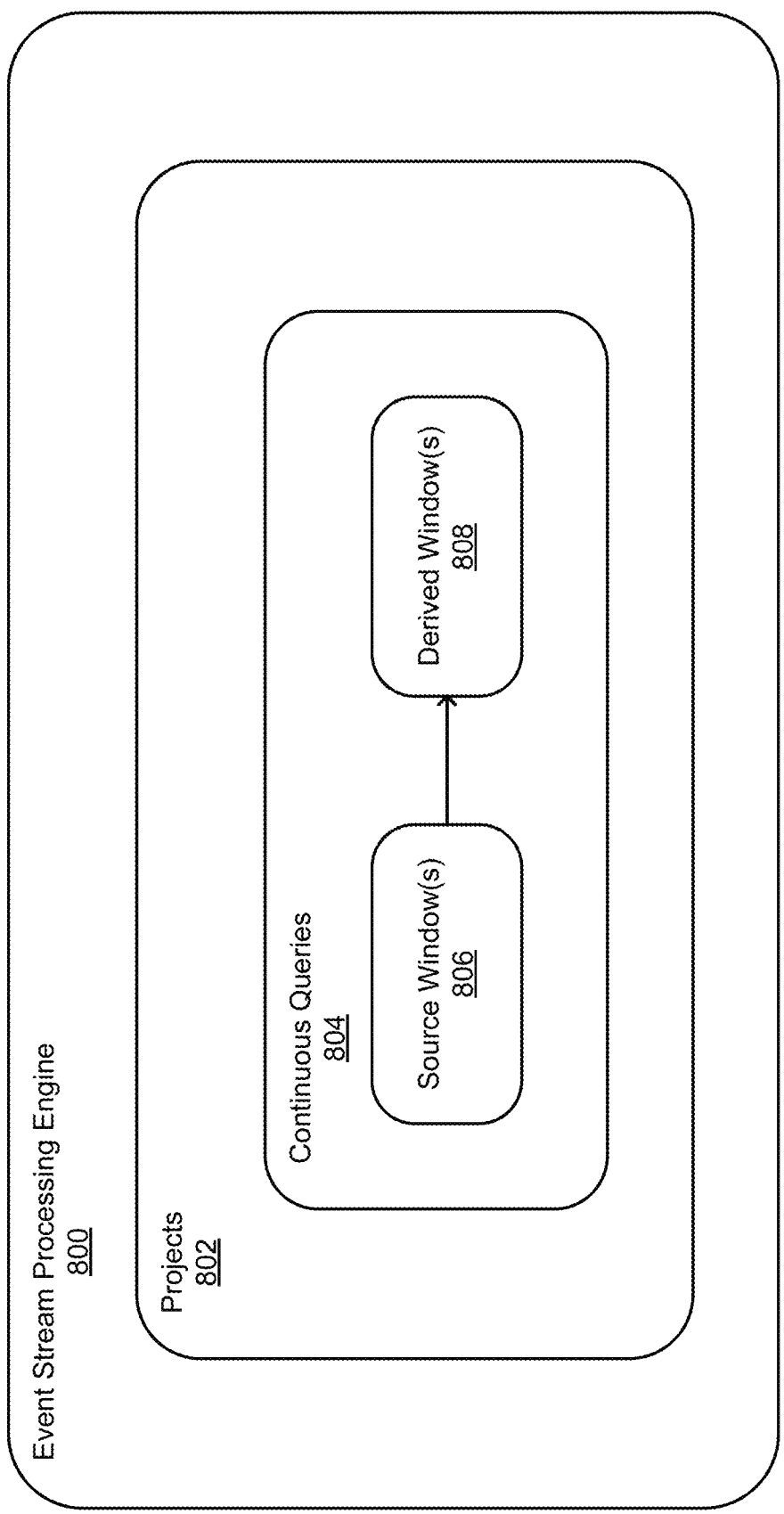
FIG. 8 illustrates a block diagram including components of an Event Stream Processing Engine (ESPE), according to embodiments of the present technology.
Figure 9:
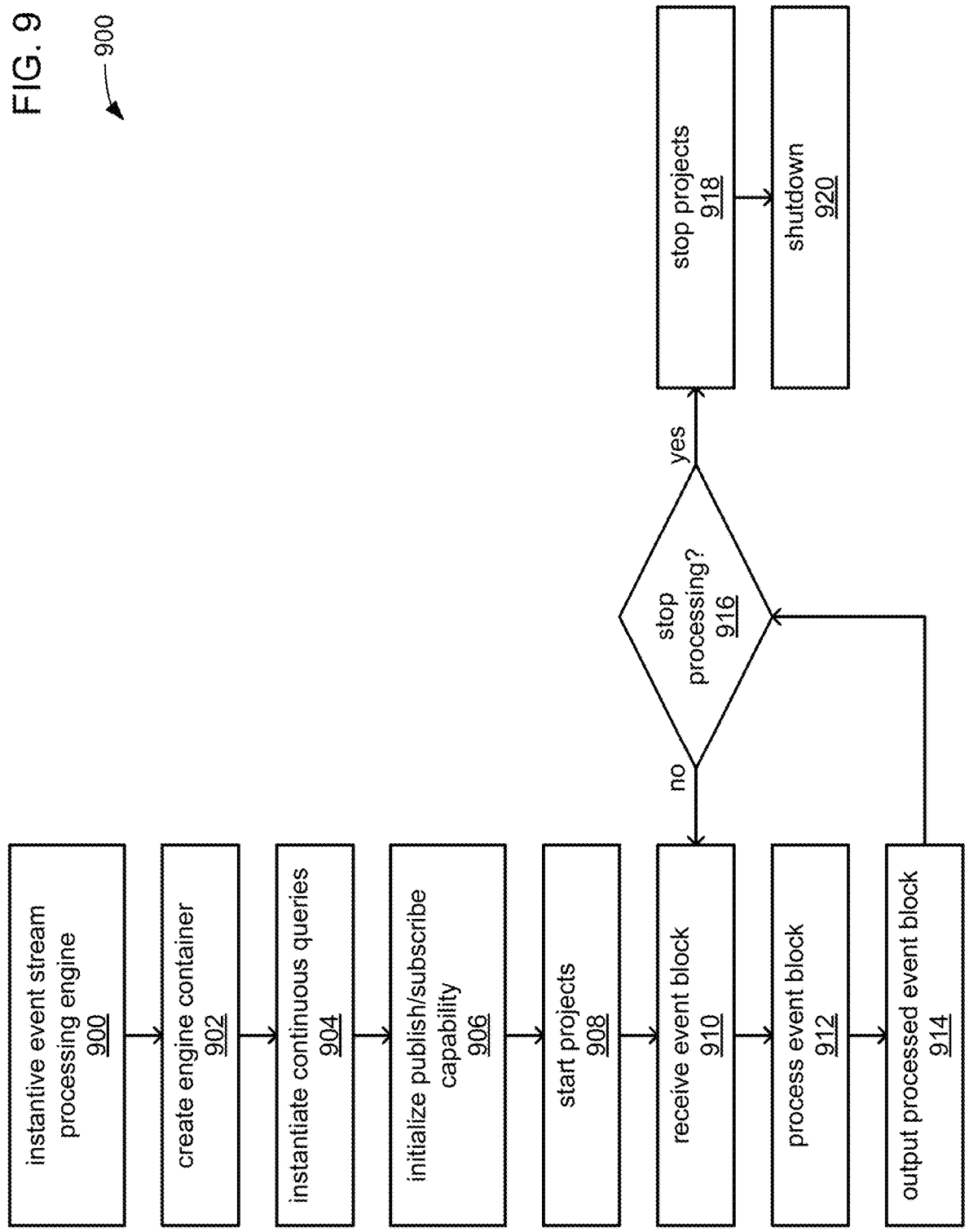
FIG. 9 illustrates a flow chart showing an example process including operations performed by an event stream processing engine, according to some embodiments of the present technology.
Figure 10:
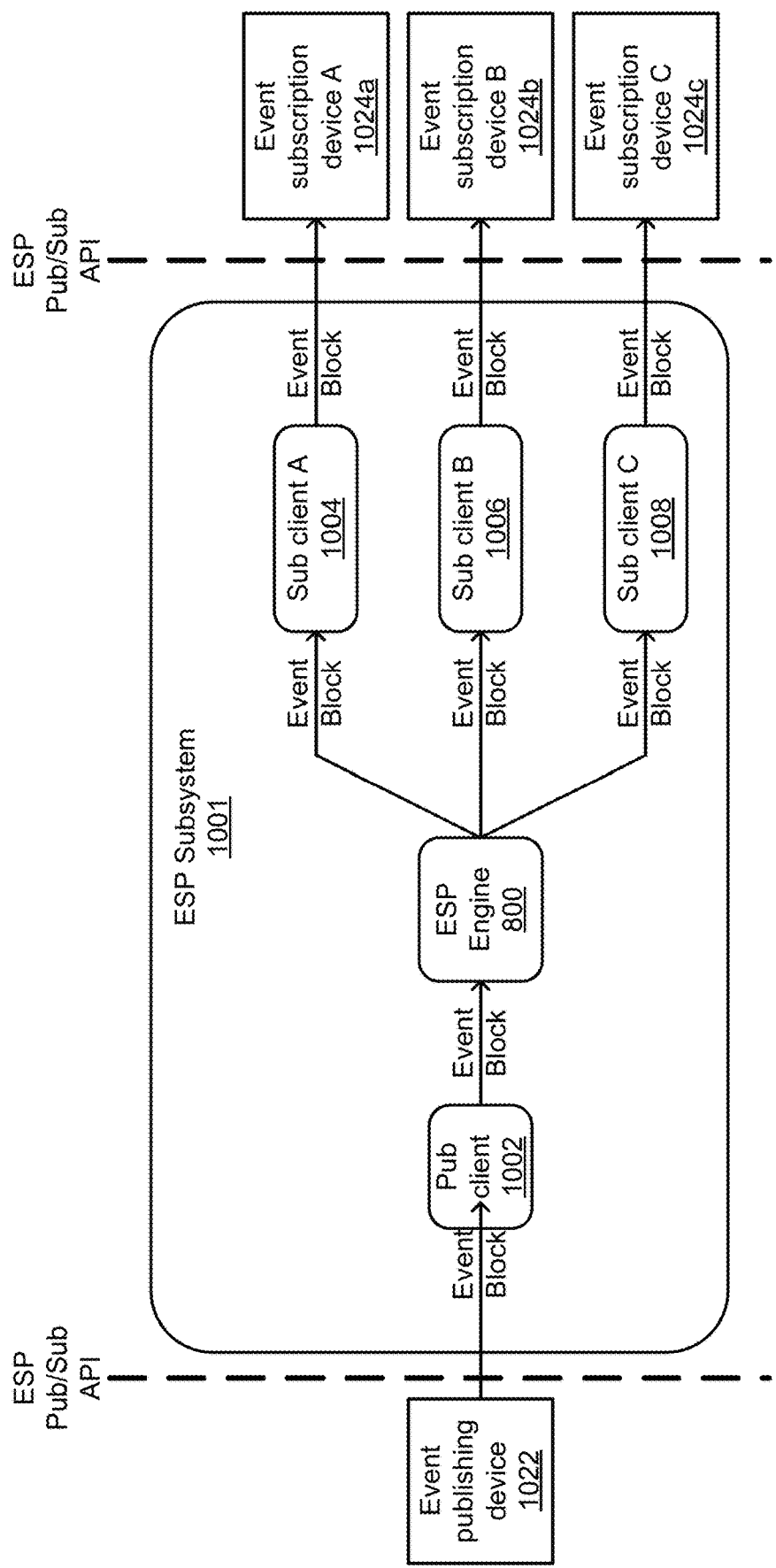
FIG. 10 illustrates an ESP system interfacing between a publishing device and event subscribing devices, according to embodiments of the present technology.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
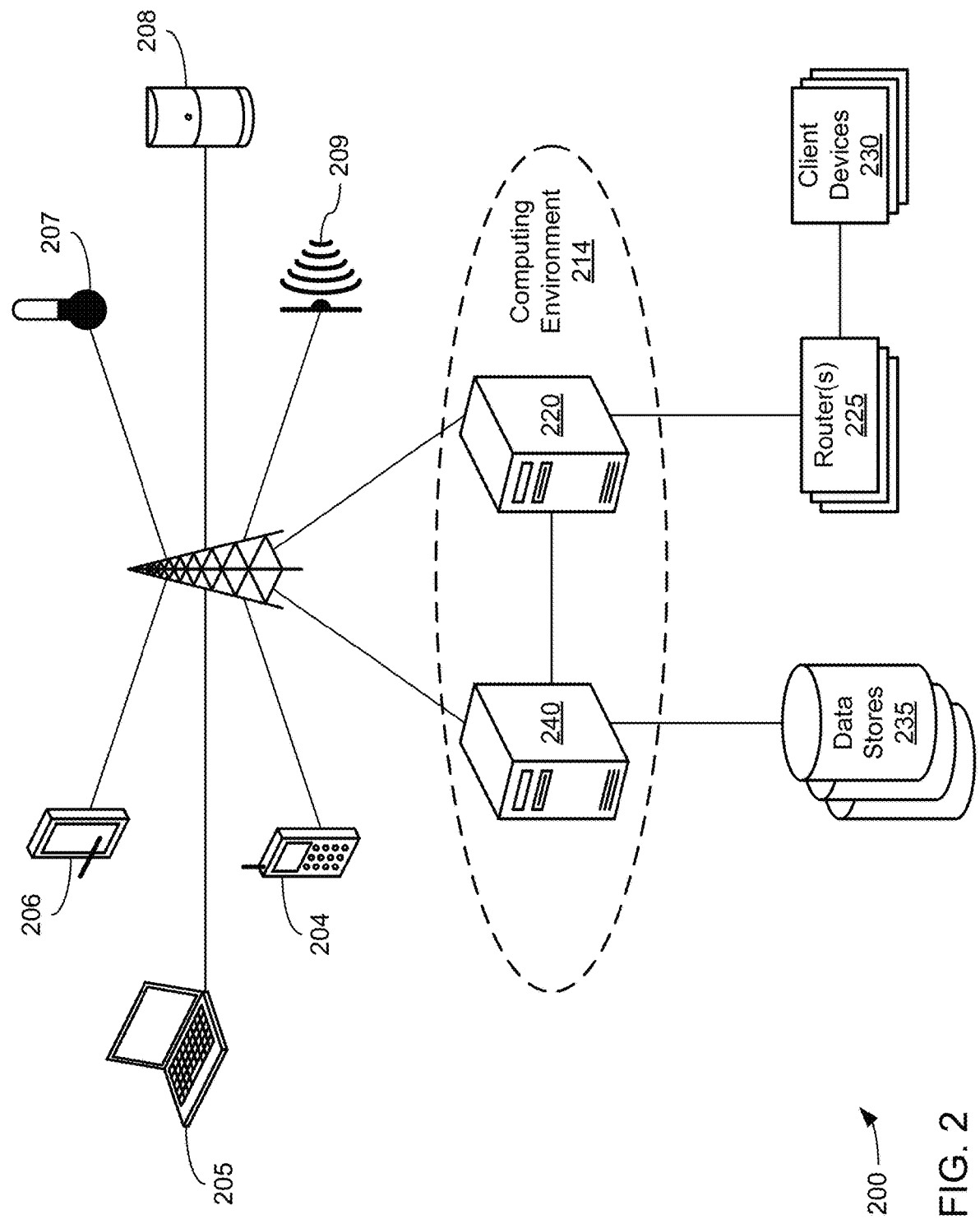
FIG. 2 illustrates an example network including an example set of devices communicating with each other over an exchange system and via a network, according to embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
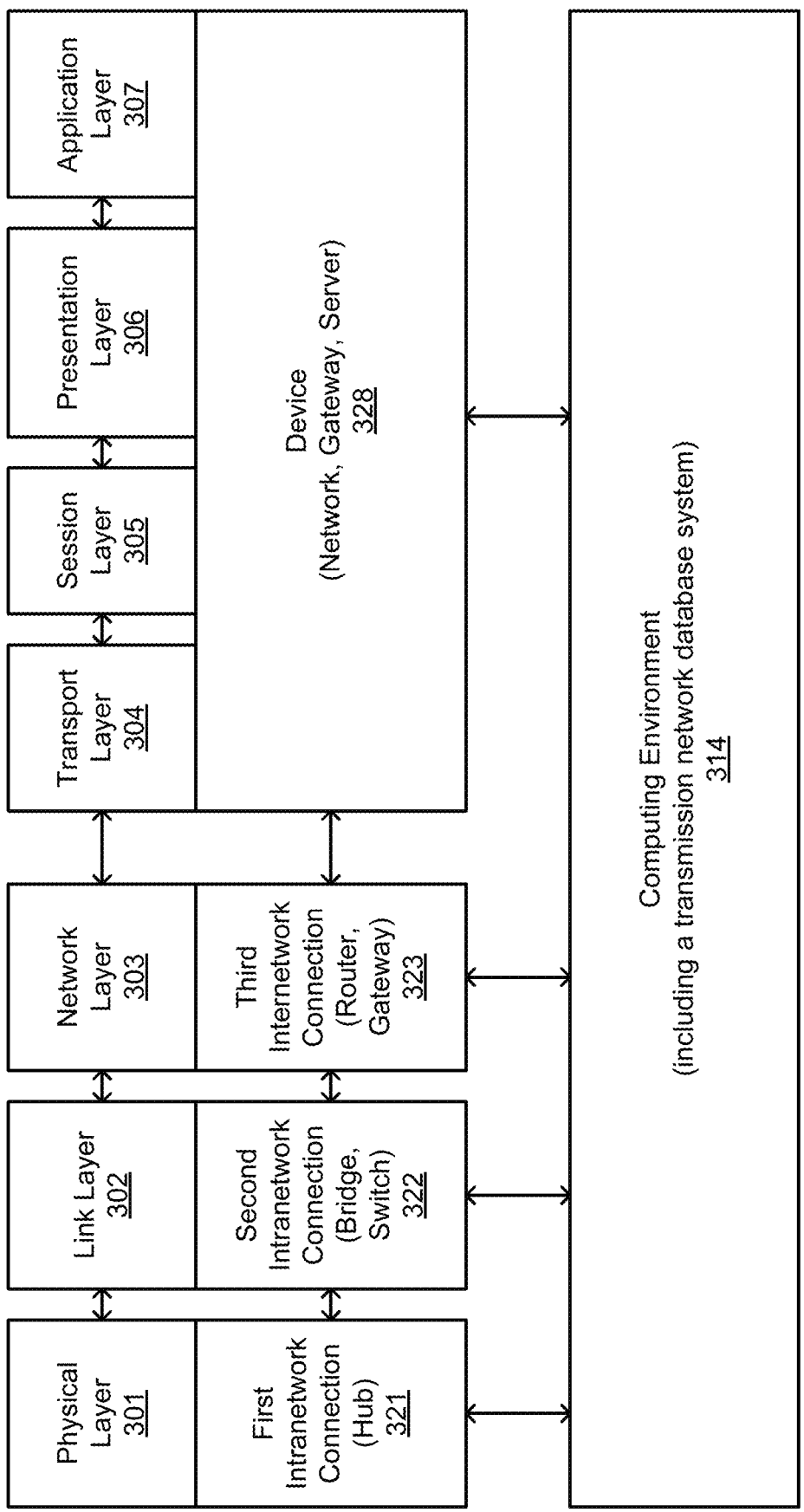
FIG. 3 illustrates a representation of a conceptual model of a communications protocol system, according to embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
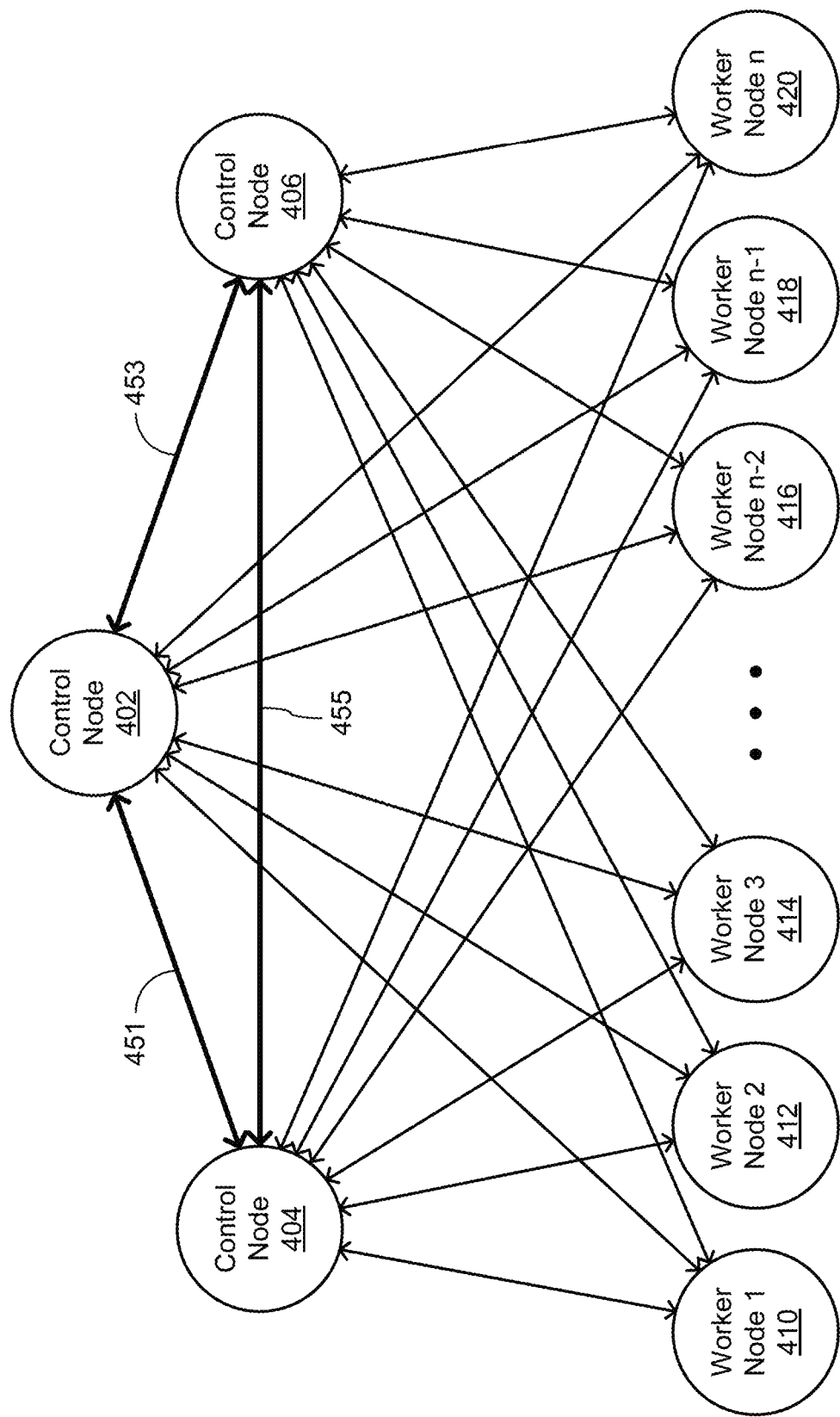
FIG. 4 illustrates a communications grid computing system including a variety of control and worker nodes, according to embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
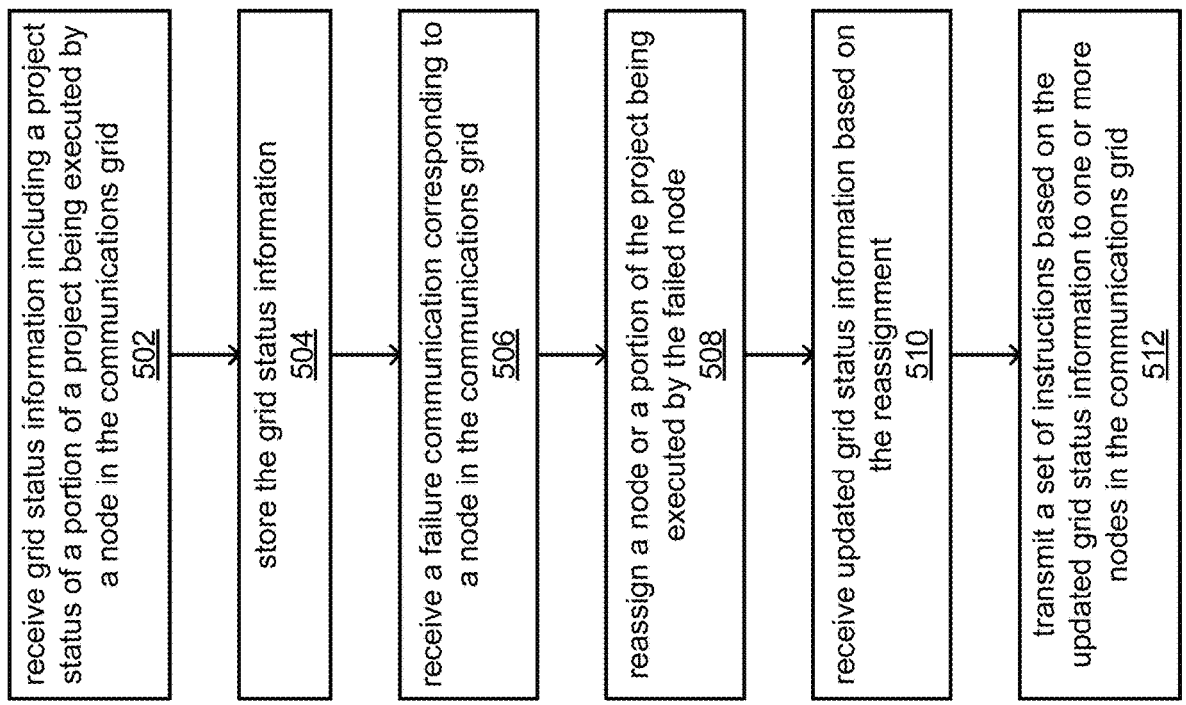
FIG. 5 illustrates a flow chart showing an example process for adjusting a communications grid or a work project in a communications grid after a failure of a node, according to embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
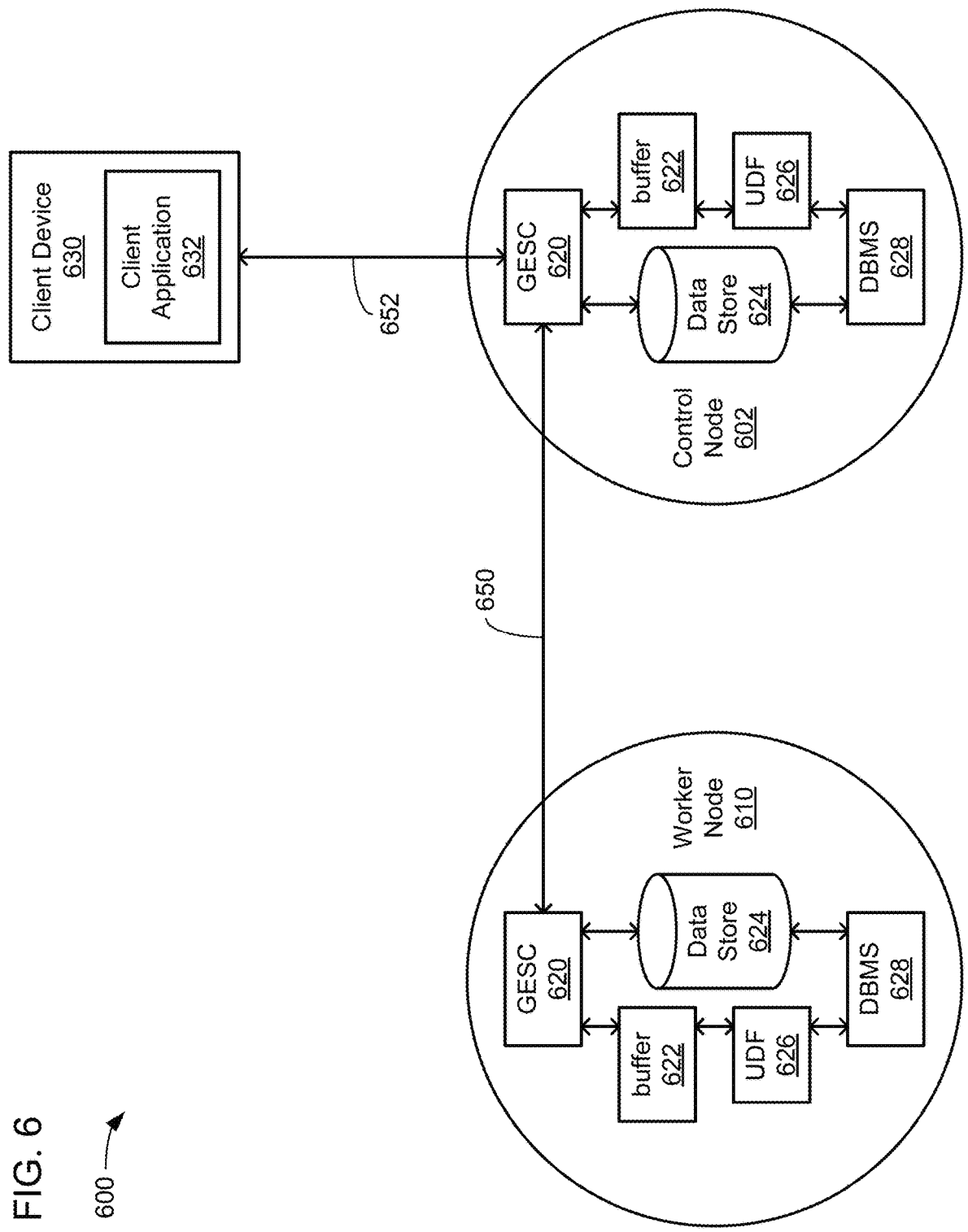
FIG. 6 illustrates a portion of a communications grid computing system including a control node and a worker node, according to embodiments of the present technology.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
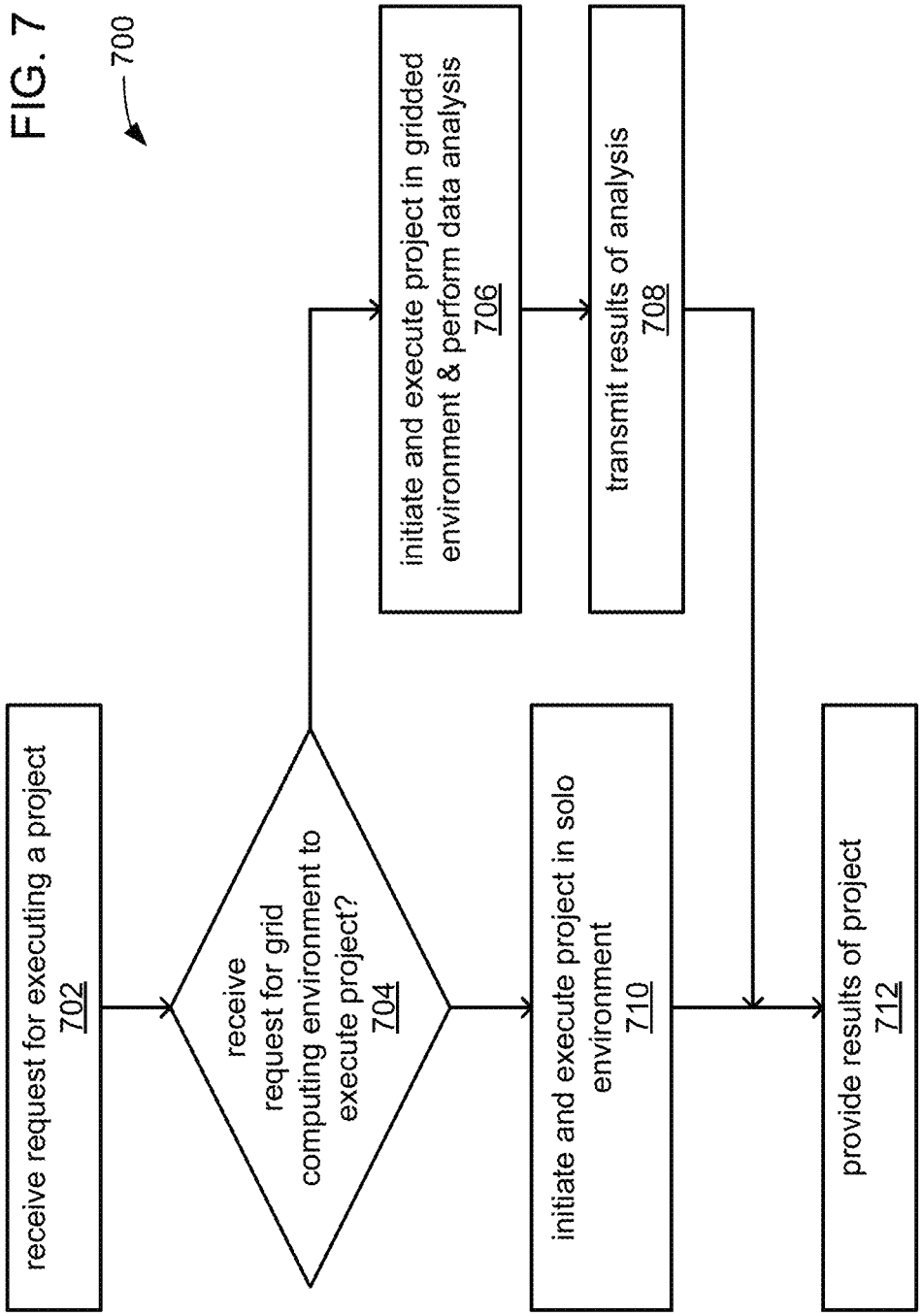
FIG. 7 illustrates a flow chart showing an example method for executing a project within a grid computing system, according to embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
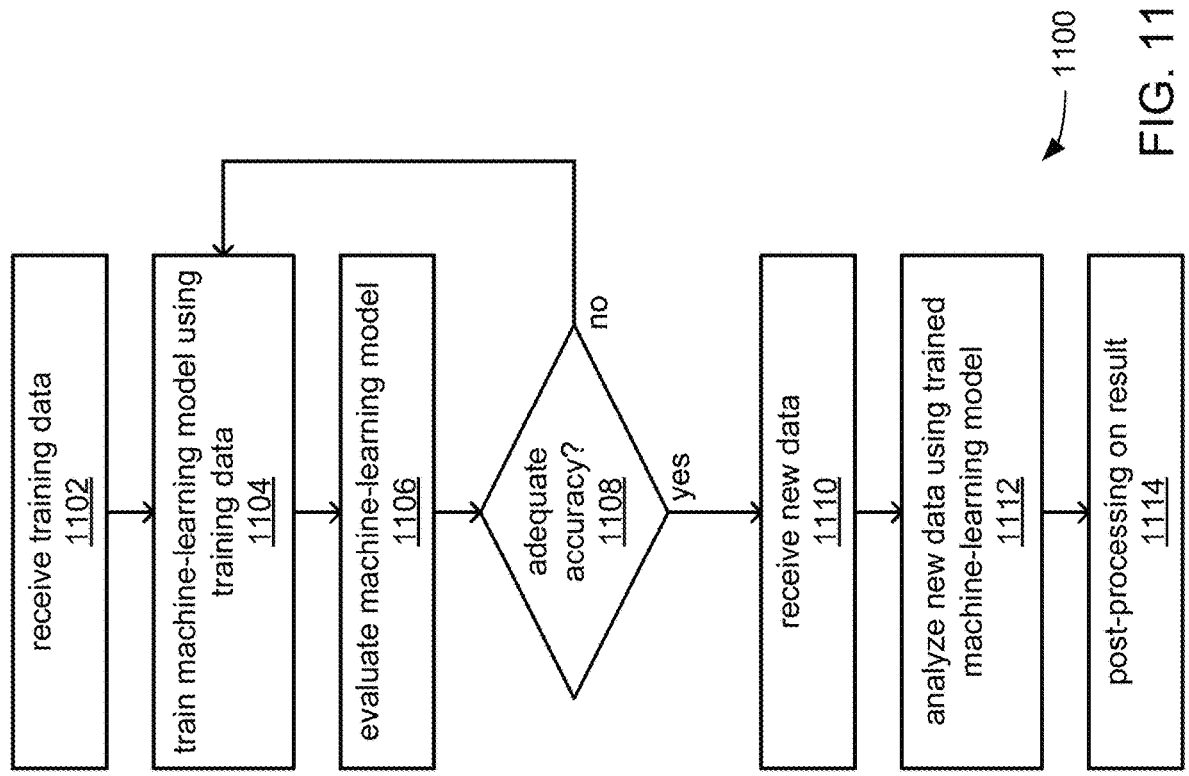
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
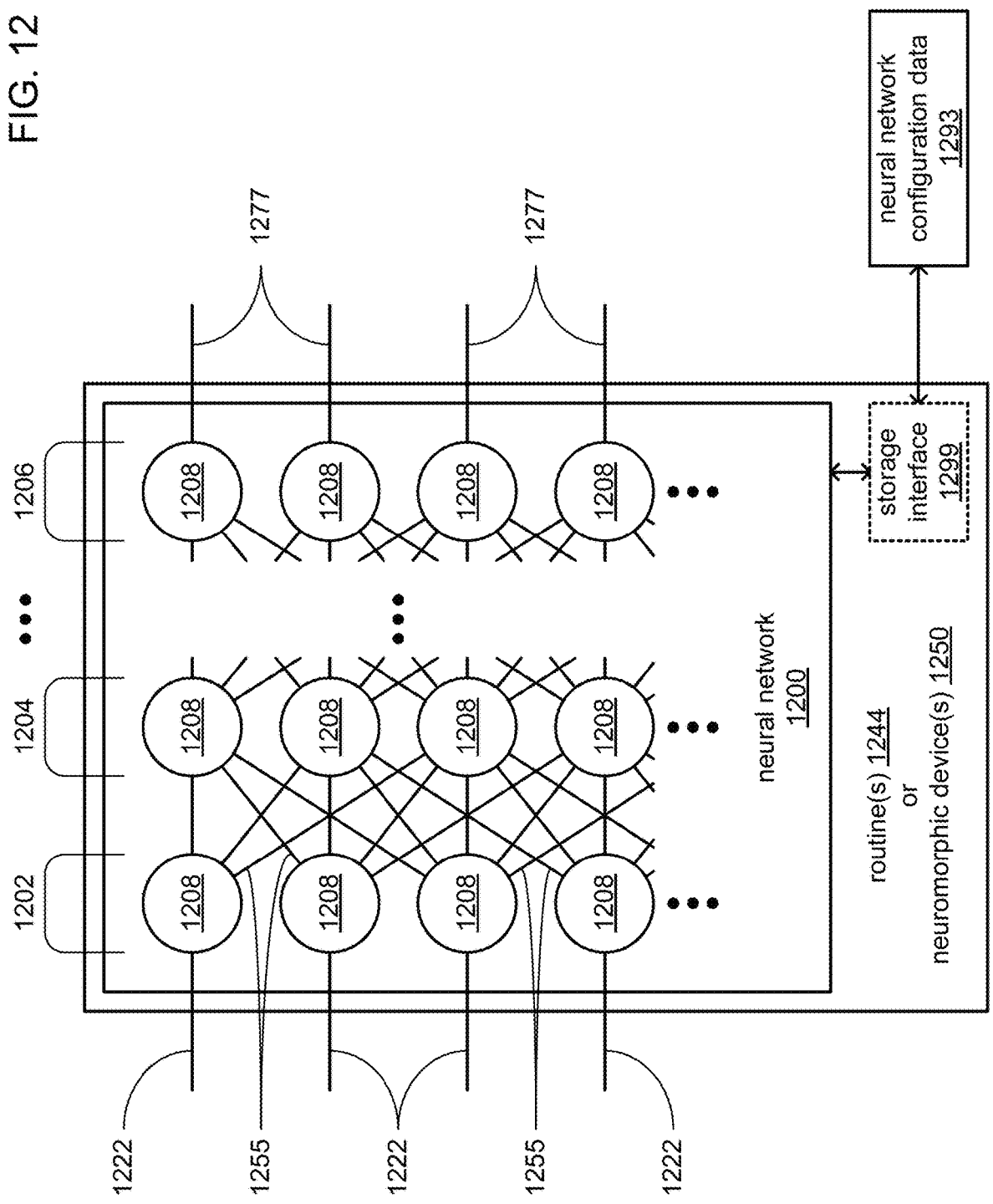
FIG. 12 is an example machine-learning model according to some aspects.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
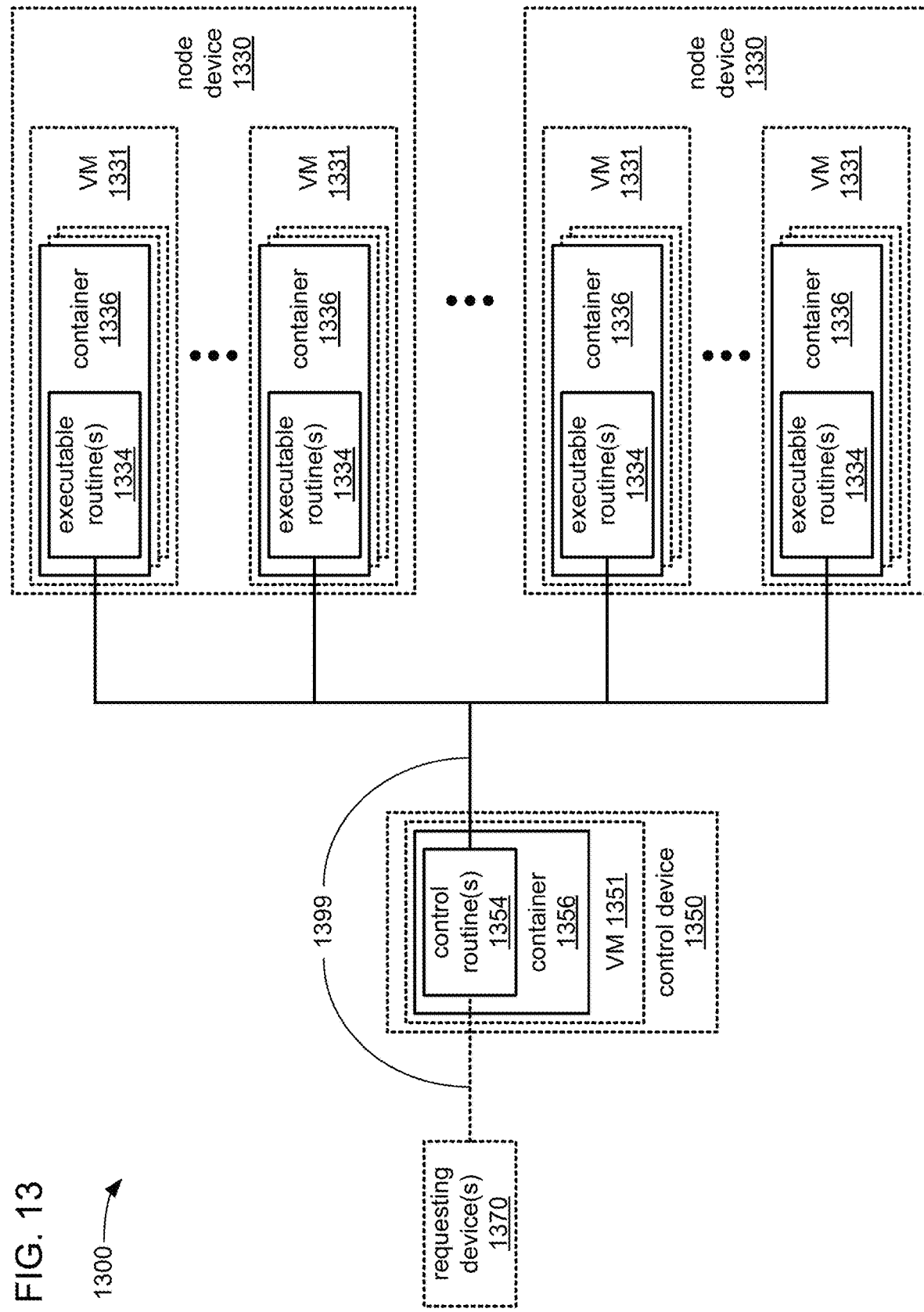
FIG. 13 illustrates various aspects of the use of containers as a mechanism to allocate processing, storage and/or other resources of a processing system to the performance of various analyses according to some aspects.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, Calif., USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
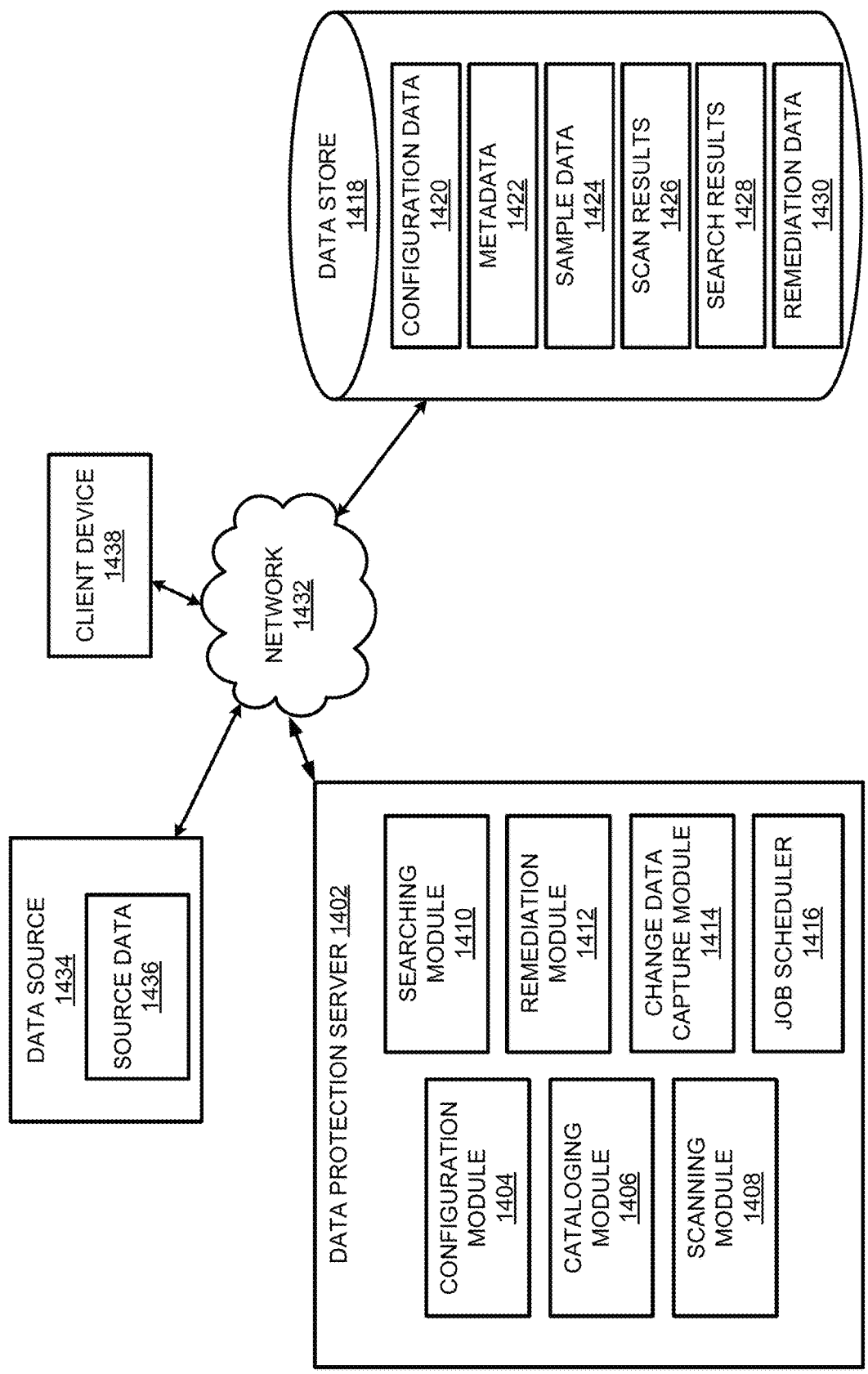
FIG. 14 is a block diagram of an example of a data protection system that can execute different operations on source data via multiple modules, according to some aspects.

FIG. 14 is a block diagram of an example of a data protection system 1400 that can execute different operations on source data 1436 via multiple modules, according to some aspects. The data protection system 1400 includes a data protection server 1402 connected with a data store 1418, a client device 1438, and a data source 1434 via network 1432. The network 1432 can be network 108 illustrated in FIG. 1. The client device 1438 can be any of the network devices 102 and client devices 204-209. The client device 1438 communicates with the data protection server 1402 via network 1432. The client device 1438 can be installed with a client-side application provided by the data protection server 1402. The client-side application can include a data management component. The data management component is configured to manage and customize pre-built definitions and data types, which can be used by the data protection server 1402 to search and group the source data. For example, the pre-built definitions are for filed name elements at filed content level, such as column names (e.g., email addresses, phone number, names, addresses, organizations, dates, postal codes, etc) at column level. The client-side application can also include a data integration component. The data integration component contains pre-built jobs, such as cataloging jobs, scanning jobs, and searching jobs. The client-side application can also include a graphical user interface (GUI) component for data visualization. The visual analytics component can be a customized dashboard to visualize scan results and generate custom reports. The client device 1438 can request the data protection server 1402 to process source data 1436 stored in a data source 1434.

The data protection server 1402 is configured to scan the source data 1436 for detecting target data, such as PII, from source data 1436, and execute certain security actions. The data protection server 1402 may include a single machine or a computing environment configured in a distributed computing network with a controller and multiple nodes. In some examples, the data protection server 1402 includes a configuration module 1404, a cataloging module 1406, a scanning module 1408, a searching module 1410, a remediation module 1412, a change data capture module 1414, and a job scheduler 1416.

The configuration module 1404 can define and connect to certain data source 1434 which stores source data 1436 for detecting and protecting target data. The data source can be database or a file system. The data source 1434 can be a Relational Database Management System (RDBMS). In some examples, the source data 1436 is a directory of files. Once the data protection server 1402 is configured to connect with a specific data source 1434 via the configuration module 1404, related configuration data 1420 can be stored in a data store 1418. The configuration data 1420 can include information about the connected data source 1434, such as location and access permissions.

The cataloging module 1406 is configured to extract metadata 1422 about the source data 1436. In some examples, the source data 1436 is a directory of files. The directory of files includes data tables, which includes columns of data. The cataloging module 1406 can gather metadata 1422 including information at a directory level (e.g., directory location, directory proprietorship, permissions, and access control lists (ACLs)), information at a file level (e.g., file location, file name, file size, security information, and file proprietorship), information at a table level (e.g., table name, location, owner, security information, and size), and information at column level (e.g., column name, column data type, and column length). The cataloging module 1406 can be configured to extract metadata 1422 about multiple directories of files serially or in parallel based upon computing resources of the data protection server 1402. In some examples, the metadata 1422 can be stored as a data catalog. The configuration data 1420 can also be stored in the data catalog. In some examples, the cataloging module can sort the data in a directory of files based on the metadata 1422 to create sorted data.

The scanning module 1408 is configured to scan source data 1436. In some examples, the scanning module 1408 may not scan the entire source data 1436, but rather the scanning module 1408 extracts sample data 1424 from source data 1436 based on the metadata 1422 to achieve certain accuracy level and at the same time reduce processing time. The scanning module 1408 can generate parallel scanning-job-submission services, which in turn can submit scanning jobs to a job schedule 1416 for execution in parallel. The scanning jobs are configured to scan and group the sample data 1424 into certain groups to create scan results 1426. The scan results 1426 may include one or more data groups. The sample data 1424 and the scan results 1426 can be stored in the data store 1418.

The searching module 1410 is configured to look up certain data sets in the scan results 1426 that match search criteria in a search request. For example, the searching module 1410 can identify tables that contain data satisfying the search criterion as search candidates and exclude the remainder of the data from the search candidates. In other words, tables that do not match the search criteria can be excluded from the search candidates. The search results 1428 are then generated for the search request. The search results 1428 may include some or all of the data in the search candidates. The search results 1428 can be stored in the data store 1418.

The remediation module 1412 is configured to perform one or more operations in response to detecting certain types of data in the scan results 1426. For example, the remediation module 1412 can classify some or all of the detected target data from the scan results into one or more sensitivity classes, such as secret, highly confidential, or confidential. The remediation module 1412 can also automatically execute certain security actions based on these classifications. For example, if a file is classified as highly confidential, the remediation module 1412 can move the file to a restricted folder, restrict access to the file, delete the file from a file system, or delete certain column values from a table in the file. This may help prevent the unintentional disclosure of highly confidential information or may help to comply with certain laws or regulations.

The source data 1436 may include hundreds of thousands of directories to be cataloged and scanned. The change data capture module 1414 is configured to determine which of these directories have had activity since the cataloging process was last run. The change data capture module 1414 may then incrementally process only the directories that have had activity, thereby limiting the number of directories in the cataloging data queue and the limiting the number of files in the scanning data queue. Similarly, the change data capture module 1414 is configured to determine which files have had activity since the scanning process was last run and incrementally process only the files that have had activity, thereby limiting the number of files in the scanning data queue. This can shorten the overall execution time of the end-to-end cataloging and scanning process. Even though the cataloging data queue and the scanning data queue can be loaded changed data for incremental processing, such as changed directories for cataloging and changed files for scanning, it does not mean to limit the cataloging and scanning process only for changed data. Cataloging can be performed on all the directories of files for a data source or changed directories of files since last run, based on system customization. Similarly, scanning can be performed on all the files in a directory or only changed files based on system customization. In some examples, the change data capture module 1414 can detect and flag changes in a directory of files. Only directories that have had a change are flagged for processing, while all other directories are flagged to be excluded from processing. As examples, the following changes can be detected and flagged for processing: (i) datasets have been added to an existing directory; (ii) datasets have been changed in an existing directory; (iii) datasets have been deleted from an existing directory; (iv) new directories containing datasets are added; and (v) directories that previously contained datasets no longer exist or no longer contain datasets.

The job scheduler 1416 is configured to control the execution of jobs submitted by various processing modules, such as cataloging jobs submitted by the cataloging module 1406, scanning jobs submitted by the scanning module 1408, and searching jobs submitted by the searching module 1410. The job scheduler 1416 can set, or enable users to edit, the schedule and conditions for execution of different types of jobs, such as cataloging jobs, scanning jobs, and searching jobs. The job scheduler 1416 can identify worker nodes in the computing environment that are available to execute jobs and coordinate the execution of those jobs.

Although shown separately from the data protection server 1402, it will be appreciated that the data store 1418 can alternatively be part of the data protection server 1402. When separate from the data protection server 1402, the data store 1418 can have its own server and operate independently of the data protection server 1402. The data store 1418 can store various data types processed or generated by the data protection server 1402. In some examples, the various data types are stored in a data model specifically designed and optimized to support and orchestrate different processes, such as cataloging, scanning, searching, and remediating, audit, and storage. The data model includes data in subject areas such as configuration (e.g., configuration data 1420), cataloging (e.g., metadata 1422), sampling (e.g., sample data 1424), scanning (e.g., scan results 1426), searching (e.g., search results 1428), remediation (e.g., remediation data 1430), generated from processing the source data 1436. The metadata 1422 and the scan results 1426 for the source data allow for efficient search and remediation of the source data 1436. The scan results 1426 include the results from scanning at the table level and column level and categorizing source data into different groups. The remediation data 1430 can include the remediation actions and associations of datasets to remediation actions. The data model can also include audit data, control data, and reference data, which are not shown in FIG. 14. The audit data can include information about execution of different jobs (e.g., cataloging jobs, scanning jobs, and searching jobs), such as execution date and job status. The control data can include dynamic content that determines what data is cataloged, scanned, and searched. The reference data includes a list of predefined group types for the source data 1436.

Figure 15:
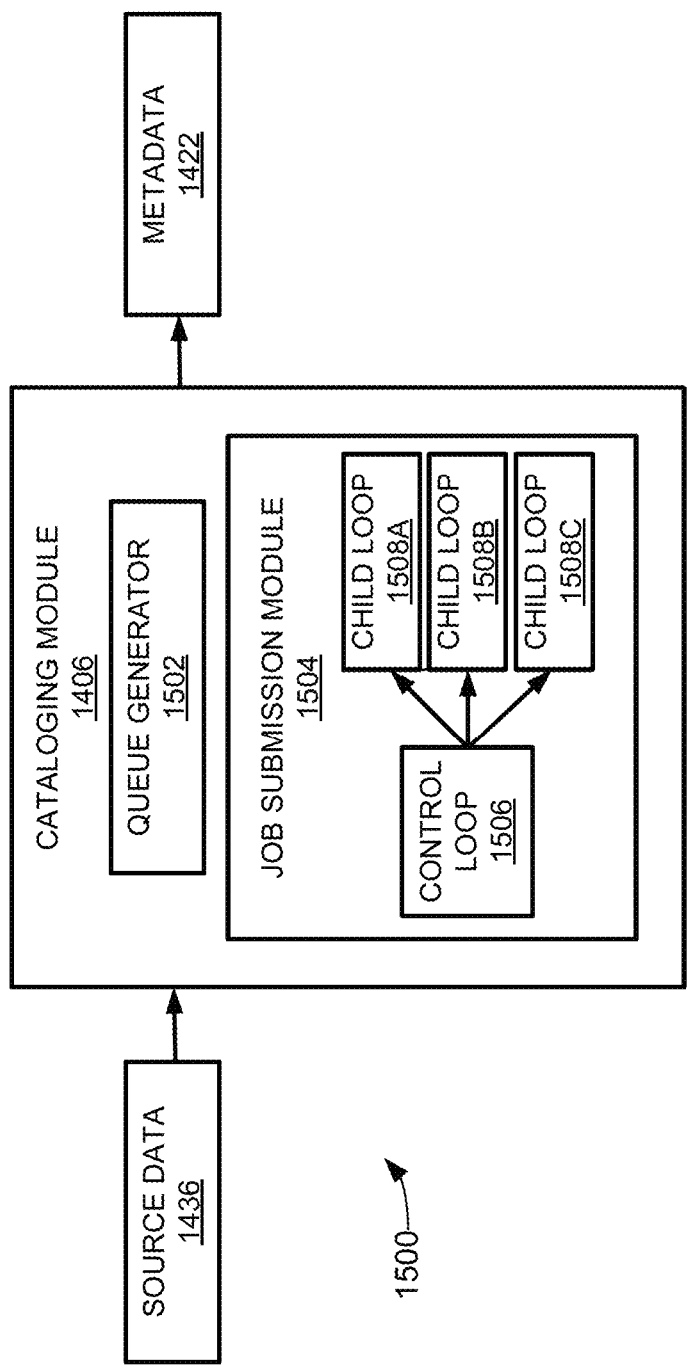
FIG. 15 depicts a block diagram of a cataloging process where a cataloging module is configured to extract metadata, according to some aspects.

FIG. 15 depicts a block diagram of a cataloging process 1500 where a cataloging module 1406 is configured to extract metadata 1422 and sort the source data 1436 based on the metadata 1422, according to some aspects. A user request can be transmitted via a client device 1438 to the data protection server 1402 for processing the source data 1436. The processing may start with extracting metadata 1422 about the source data 1436. The cataloging module 1406 is configured to extract metadata, which includes a queue generator 1502 and a job submission module 1504. The queue generator 1502 is configured to generate a cataloging data queue for the source data 1436. In some examples in which the source data 1436 includes multiple directories of file, the queue generator 1502 can generate a cataloging data queue in the form of a table and load one directory of files in each row of the table. Thus, a cataloging data queue is generated with multiple directories of files loaded in an ordered list for batch processing. One cataloging job can be created for one directory of files, and multiple cataloging jobs are created for the multiple directories of files. The multiple cataloging jobs can be processed serially or in parallel based upon system resources.

The job submission module 1504 includes a control loop 1506 configured to deploy a number of cataloging-job-submission services based on a configurable runtime parameter associated with the control loop 1506. The configurable runtime parameter can be selected based on any suitable measure, such as the computing capacity of the computing environment. The configurable runtime parameter can also be based on the total size of source data to be cataloged.

Each cataloging-job-submission service can be considered a child loop of the control loop 1506. For example, the control loop 1506 deploys child loop 1508A, child loop 1508B, and child loop 1508C in parallel. Each child loop is configured for providing cataloging-job-submission service. Once deployed, each cataloging-job-submission service can retrieve one or more directories from the cataloging data queue and generate a number of cataloging jobs for cataloging the corresponding directories. In some examples, each cataloging-job-submission service can retrieve an equal number of directories from the cataloging data queue, which may be determined using a mod algorithm or any other suitable approach. To deploy the cataloging jobs, the cataloging-job-submission services can submit their respective cataloging jobs in parallel to a job scheduler for execution. Each cataloging job is configured to extract metadata about a directory of files designated for the cataloging job. The job scheduler 1416 can set, or enable users to edit, the schedule and conditions for execution of the cataloging jobs. The job scheduler 1416 may also specify which worker nodes in the computing environment are to execute the cataloging jobs. The metadata 1422 about each directory of files can include directory-level metadata, such as directory location, directory proprietorship, permissions, and ACLs; file-level metadata, such as file location, file name, file size, security information, and file proprietorship; table-level metadata, such as table names, location, owner, security information, and size; column-level metadata, such as column name, column data type, and column length; or any combination of these. The metadata 1422 can be stored in the data store 1418. Alternatively, or additionally, the metadata 1422 can be stored in a data catalog, which allows for querying of the metadata 1422 about certain data upon a compliance request. The data catalog can be stored in the data store 1418.

Figure 16:
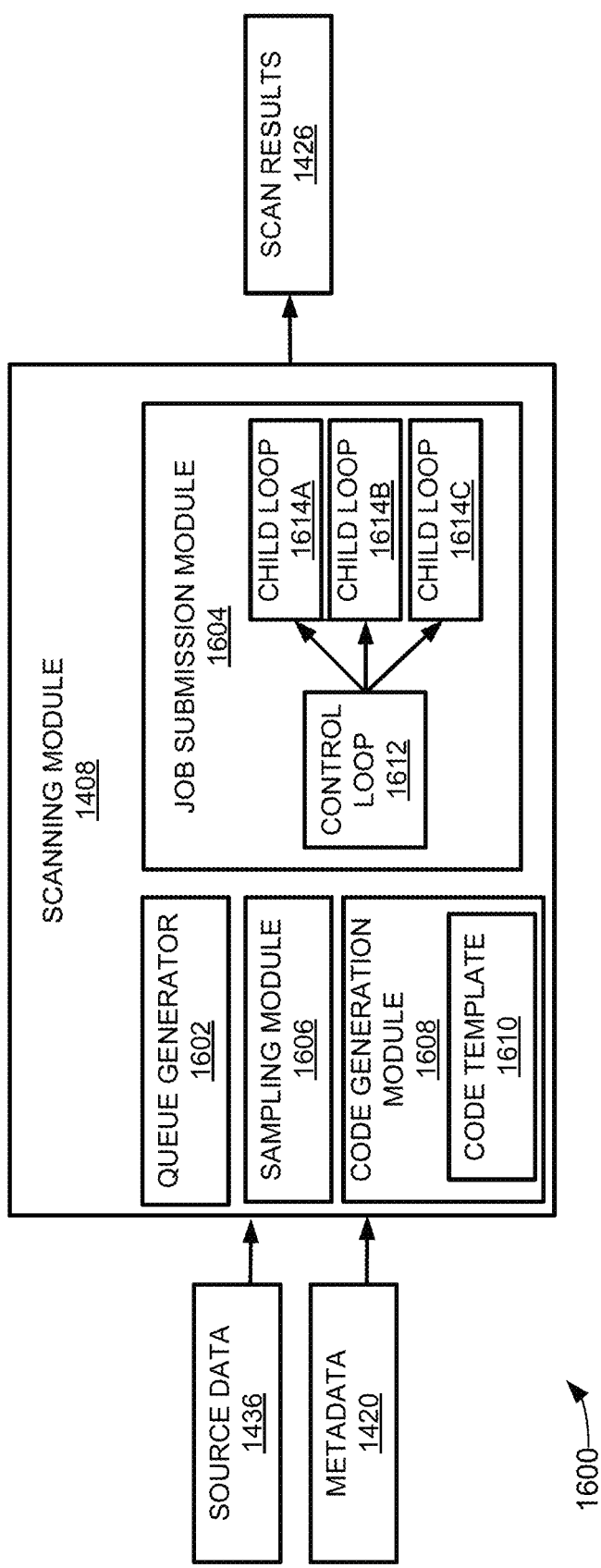
FIG. 16 depicts a block diagram of a scanning process where a scanning module scans the source data to create scan results, according to some aspects.

FIG. 16 depicts a block diagram of a scanning process 1600 where a scanning module 1408 scans the source data 1436 to create scan results 1426, according to some aspects. The scanning module 1408 includes a queue generator 1602, a job submission module 1604, a sampling module 1606, and a code generation module 1608.

The queue generator 1602 is configured to load the source data 1436 into a scanning data queue. In some examples, the source data 1436 is a directory of files, then one file can be loaded per row in the scanning data queue. Thus, a scanning data queue is generated with multiple files loaded in an ordered list for batch processing.

The job submission module 1604 includes a control loop 1612 for scanning-job submissions. The control loop 1612 is configured to deploy a configurable number of scanning-job-submission services in parallel based on a runtime parameter associated with the control loop 1612. The runtime parameter may be based on the computing capacity of the computing environment, the total number of files in the scanning data queue to be scanned, and/or other factors. Each scanning-job-submission service can be considered a child loop for the control loop 1612. For example, the control loop 1612 deploys child loop 1614A, child loop 1614B, and child loop 1614C in parallel. Each child loop is configured for providing scanning-job-submission service. Once deployed, each scanning-job-submission service can retrieve one or more files from the scanning data queue and create a number of scanning jobs for scanning the one or more files retrieved. In some examples, each scanning-job-submission service can retrieve an equal number of files from the scanning data queue, which may be determined using a mod algorithm or any other suitable approach. To deploy the scanning jobs, the scanning-job-submission services can submit their respective scanning jobs in parallel to a job scheduler for execution. Each scanning job is configured to scan a particular file designated for the scanning job for detecting target data. In some examples, the scanning jobs are also configured to scan the files in scanning data queue for categorization. During the categorization process, data columns in the files can be categorized into different group types. The group types can be determined using metadata (e.g., column names) and content (e.g., data values) of the columns. The job scheduler 1416 can set, or enable users to edit, the schedule and conditions for execution of the scanning jobs. The job scheduler 1416 may also specify which worker nodes in the computing environment are to execute the scanning jobs.

Not every data in the source data needs to be scanned for target data. For example, not every row in a table in a file needs to be scanned for the target data. The sampling module 1606 is configured to extract sample data 1424 for scanning from the particular file for each scanning job. The sampling module 1606 can retrieve metadata about the particular file, for example from the metadata 1422 about the directory of files, and determine a sample size based on the metadata about the particular file. The sample size is an amount of data in the particular file to be scanned for target data. The sample size can be determined to maintain a certain accuracy level and meanwhile reduce scanning time. In some examples, the sampling module 1606 can implement a statistical algorithm to determine the sampling size. The statistical algorithm can have one or more parameters, such as z-Score, Margin of Error, and probability of class, that control the sample size. The parameters may be adjusted based on the metadata of the directory of files that includes the particular file. For example, a sampling size can be determined using equation (1) below:

$$\text{Sample Size} = \frac{\frac{z^2 \times p(1-p)}{e^2}}{1 + \frac{z^2 \times p(1-p)}{e^2 N}} \tag{1}$$

wherein N represents population size, e represents margin of error, z represents z-score, and p represents probability. The population size N is the total size of a particular file to be scanned, for example, the total rows in a particular file. Z-score z is a statistic measurement that describes a distance between a data point and the mean of a group of data points. Margin of error e is a statistical number expressing an amount of random sampling error in the result of a particular operation such as scanning. Probability of class p is a frequency of an event which is a member of a homogeneous class. A sample interval can be determined using equation (2) below:

$$\text{Sample Interval} = \text{floor}\left(\frac{N}{\text{ceiling}\left(\frac{\frac{z^2 \times p(1-p)}{e^2}}{1 + \frac{z^2 \times p(1-p)}{e^2 N}}\right)}\right) \tag{2}$$

Essentially, the sample interval refers to how much data to skip for every sampling. For example, the population size is total number of rows to be scanned. When the sample size is determined using equation (1), the sample interval is the total number of rows to be scanned divided by the sample size as illustrated by equation (2). If the sample interval is m, it means every $m^{th}$ row is sampled from the total number of rows to be scanned. Thus, when a scanning job is executed with respect to a particular file, only sample data of a dynamically selected size may be extracted from that file and scanned for the target data. Scan results 1426 can be stored in the data store 1417. The sample data 1424 can also be stored in the data store 1418.

The code generation module 1608 can dynamically create scan code for each scanning job. The code generation module 1608 can use a code template 1610 for generating the scan code, which can be executed to scan a portion of the source data assigned to the scanning job (e.g., based on the corresponding metadata). The code template includes macro-variables. Some macro-variables may need to be customized for a particular scanning job. In some examples, the code generation module 1608 can create the scan code by replacing these macro-variables in the template with specific macro-variables for the particular scanning job. For example, a scanning job can be assigned to scan a set of sample data extracted from a particular file in the source data. The sample data can include columns that may be assigned unique key values. In some such examples, the code generation module 1608 can use the unique key values to create specific macro-variables for the specific scanning job, which can replace the macro-variables in the code template.

FIG. 17 illustrates example code blocks of the code generation module 1608 for generating scan code for scanning a particular file from a directory of files, according to some aspects. The scan code executed during the scan process is dynamically created based upon the metadata 1422 stored in the data store 1418 at runtime, because the structure of any specific table in the particular file may be unknown at runtime without querying the metadata.

Block 1702 illustrates an example code block that can be executed for separating character columns from numeric columns in the directory of files. The code generation module 1608 can query the metadata 1422 and the scanning data queue, to obtain a list of columns with corresponding attributes in a particular file for generating scan code for the particular file. In some examples, the code generation module 1608 can execute block 1702 to separate character columns from numeric columns and get a column count for each column type. Character columns usually contain data that are a string of single-byte or multibyte letters, numbers, and other characters. Numeric columns usually contain data that has numeric values. The numeric values can be exact or approximate.

Block 1704 illustrates an example code block that can be executed for creating a macro-variable for a character column and a numeric column. The code generation module 1608 can create a macro-variable using a surrogate key value associated with each character and numeric column. A macro-variable may be a string variable that allows users to dynamically modify the program code through symbolic substitution. A macro variable can contain multiple independent variables. A surrogate key value can be assigned to each column during cataloging. A macro-variable can store the surrogate key value and the group type for each column. For example, if a column's surrogate key value is 1278, then a macro-variable named c_1 can be generated for that column with a value of C1278. Then a variable C1278_v can be generated to store the data values of the column and a variable C1278_c can be generated to store the group type of the data values of the column during scanning. The code generation module 1608 can the text string the macro-variables were defined to be in the template scan code with the macro-variables created with surrogate key values to generate customized scan code for each column.

Block 1706 illustrates an example code block that can be executed for categorizing the columns. The example code block 1706 can be executed to create a column value array containing data values of scanned columns and a column name array containing column names of the columns to be scanned. The column values in each column and the column names for columns to be scanned can be used as basis for grouping the columns. A column categorization array can be created to include various group types for the columns to be scanned by each scanning job. The above-mentioned arrays are created for character columns and numeric columns separately. These arrays can be used to generate scan code for scanning the columns in a file. The dynamically generated scan code enables array processing to facilitate scanning very wide analytical tables.

Figure 18:
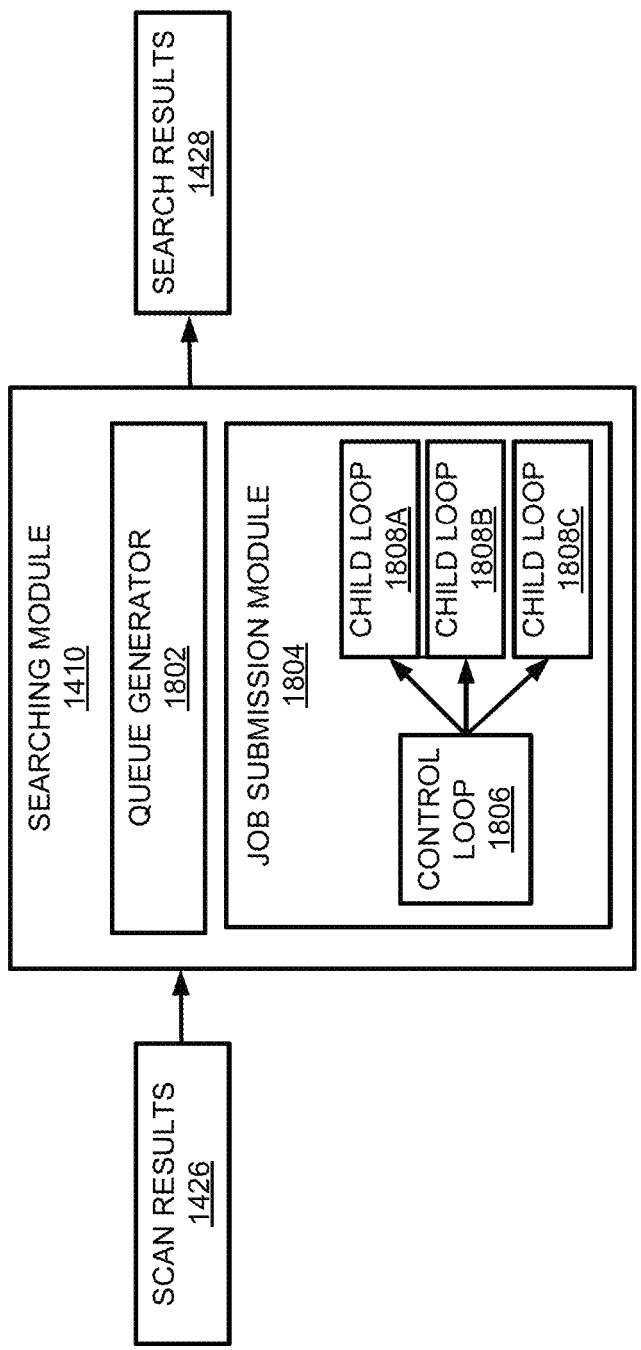
FIG. 18 is a block diagram of a searching process where a searching module searches for a particular data set in a directory of files, according to some aspects.

FIG. 18 is a block diagram of a searching process 1800 where a searching module 1410 searches for a particular data set, according to some aspects. This process is used to search a particular data set by searching the scan results 1426 of the source data 1436. Instead of searching the entire source data, such as a directory of files, the queue generator 1802 uses the scan results 1426 to identify tables that contains columns of interest that satisfies predetermined criteria. The scan results 1426 may include different group types of the source data. The predetermined criteria may specify certain groups to search. The tables that contain columns of interest from the specified groups are selected as candidate tables. The queue generator 1802 is configured to generate a searching data queue for the candidate tables. In some examples, the queue generator 1802 can generate the searching data queue in the form of a table, and load one candidate table per row in the table. Thus, a searching data queue is generated with multiple candidate tables loaded in an ordered list for batch processing. One searching job can be created to search the columns of interest in one candidate table, and multiple searching jobs are created for the multiple candidate tables. Just like the group types of the columns of interest may be determined based on metadata (e.g., column names) and content (e.g., column values) of the columns as described in detail in FIG. 24 below, each searching job can also use metadata and content of the columns of interest to search for the particular data set.

The job submission module 1804 includes a control loop 1806 for searching-job submissions. The control loop 1806 is configured to deploy a configurable number of searching-job-submission services based on a runtime parameter associated with the control loop 1806. The runtime parameter may be based on the computing capacity of the computing environment, the size of the searching data queue, and/or other factors. Each parallel searching-job-submission service can be considered a child loop for the control loop 1806. For example, the control loop 1806 deploys child loop 1808A, child loop 1808B, and child loop 1808C in parallel. Each child loop is configured for providing searching-job-submission service. Once deployed, each searching-job-submission service can retrieve one or more candidate tables from the searching data queue and create a number of searching jobs for searching the one or more candidate tables retrieved. In some examples, each searching-job-submission service can retrieve an equal number of candidate tables from the searching data queue, which may be determined using a mod algorithm or any other suitable approach. To deploy the searching jobs, the searching-job-submission services can submit their respective searching jobs in parallel to a job scheduler for execution. Each searching job is configured to search a particular candidate table for a particular data set. The job scheduler 1416 can set, or enable users to edit, the schedule and conditions for execution of the searching jobs. The job scheduler 1416 may also specify which worker nodes in the computing environment are to execute the searching jobs. The search results 1428 can be stored in data store 1418.

For example, the scan results 1426 may contain various groups of PII data. One or more of the groups of PII data may include a particular data set that needs to be identified, for example to satisfy Right to Know and/or Right to be Forgotten regulations. To identify the particular data set, the searching module 1410 can identify the one or more groups from the scan results 1426. As one particular example, it may be desirable to search for Indian cardmember transaction data. To do so, the system may first identify candidate data tables. The data tables that include data in the groups of Bank Card Numbers, Transaction Dates, and Transaction Amounts can be selected as candidate data tables. Then, the system can search the bank cards to identify which ones were owned by Indian citizens and have a valid transaction (e.g., date and amount greater than zero).

Figure 19:
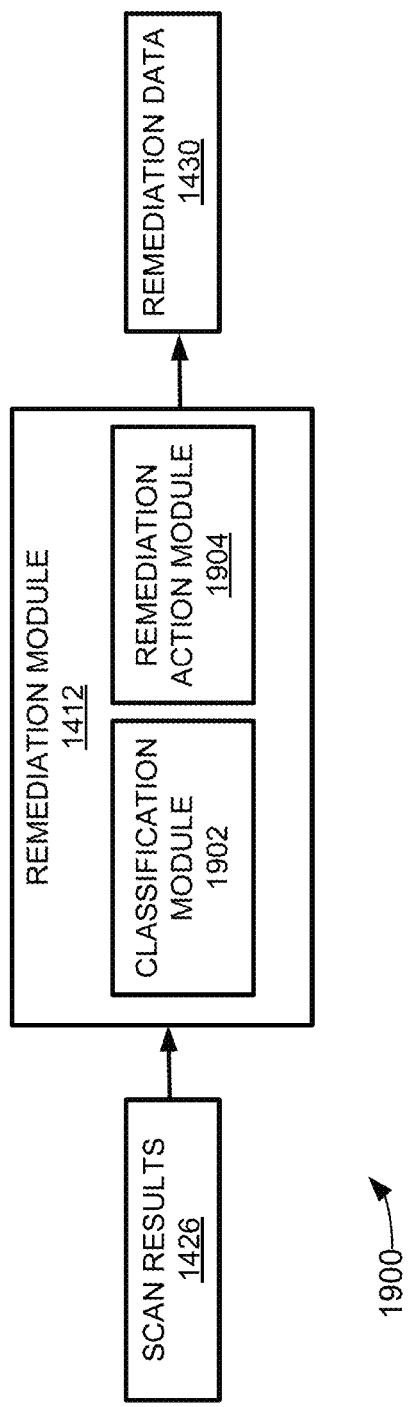
FIG. 19 is a block diagram of an example of a remediation process where a remediation module classifies the data in the scan results and executes remediation actions on certain datasets, according to some aspects.

FIG. 19 is a block diagram of an example of a remediation process 1900 where a remediation module 1412 classifies the data in scan results 1426 and executes remediation actions on certain datasets, according to some aspects. The remediation module 1412 includes a classification module 1902 and a remediation action module 1904.

The classification module 1902 is configured to classify different groups of data in the scan results 1426 into different sensitivity levels, such as secret, highly confidential, and confidential. In some examples, the classification module 1902 implements certain criteria to classify different data groups. For example, if a data group includes information pertaining to national security and defense, the data group can be classified as secret. If a data group includes PII, the data group can be classified as highly confidential. If a data group includes data that is not available to the general public, the data group can be classified as confidential.

Remediation actions may be needed for the data that is classified as secret, high confidential, or confidential, which can be referred to as classified data. The remediation action module 1904 is configured to execute certain security or remediation actions for classified data to increase its security level. Remediation actions can include (i) moving a source data table to a restricted folder; (ii) changing access controls so that only certain user groups have access to the table; (iii) deleting the table that is highly sensitive; (iv) deleting column values containing sensitive values. The remediation module 1412 can log all remediation actions as remediation data 1430, which can be stored in data store 1418. The remediation process can run on a routine schedule as part of a batch process. In some examples, data owners or custodians can review the scan results 1426 and suggested remediation actions and notify affected users prior to applying the actions.

Figure 20:
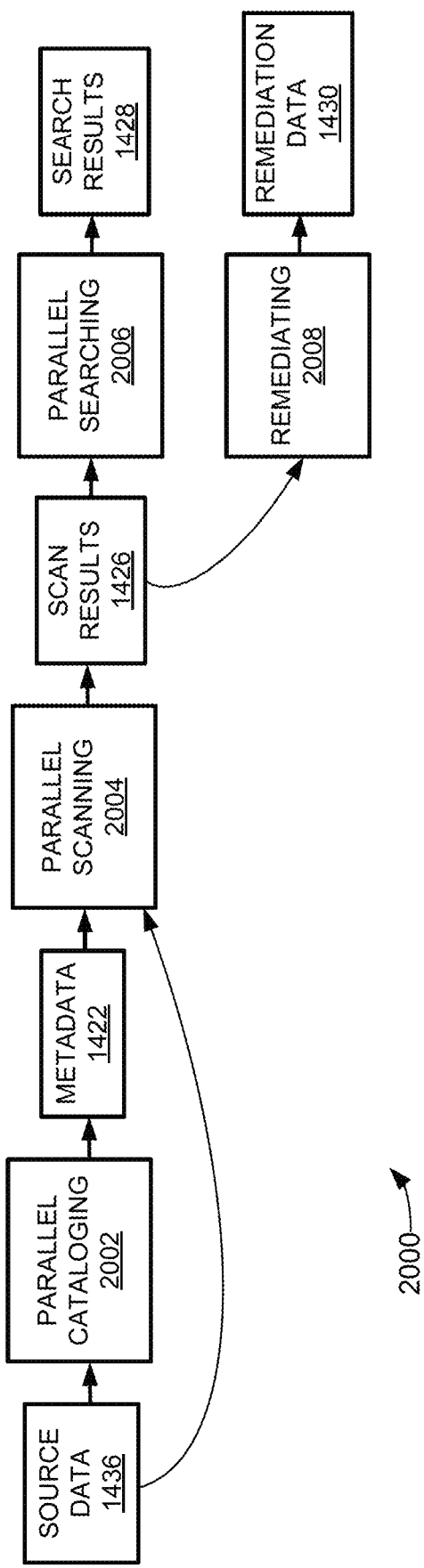
FIG. 20 is a block diagram of an example of an overall data protection process, according to some aspects.

FIG. 20 is a block diagram of an example of an overall data protection process 2000. In this example, source data 1436 can be processed to extract metadata 1422 via parallel cataloging 2002. The parallel cataloging 2002 includes parallel cataloging-job submission and parallel cataloging-job execution, generally as described as described above with respect in FIG. 15. The metadata 1422 can be used for scanning the source data 1436 to generate scan results 1426 via parallel scanning 2004. The parallel scanning 2004 includes parallel scanning-job submission and parallel scanning-job execution, generally as described as described above with respect in FIG. 16. Similarly, the scan results can be used for searching specific data sets to generate search results 1428 via parallel searching 2006. The parallel searching 2006 includes parallel searching-job submission and parallel searching-job execution, generally as described above with respect in FIG. 18. In addition, the scan results 1426 can be used for employing remediation actions to generate remediation data 1430 via a remediating process 2008, generally as described above with respect to FIG. 19. The parallel cataloging 2002, parallel scanning 2004, and parallel searching 2006 are illustrated in more detail in FIG. 21.

Figure 21:
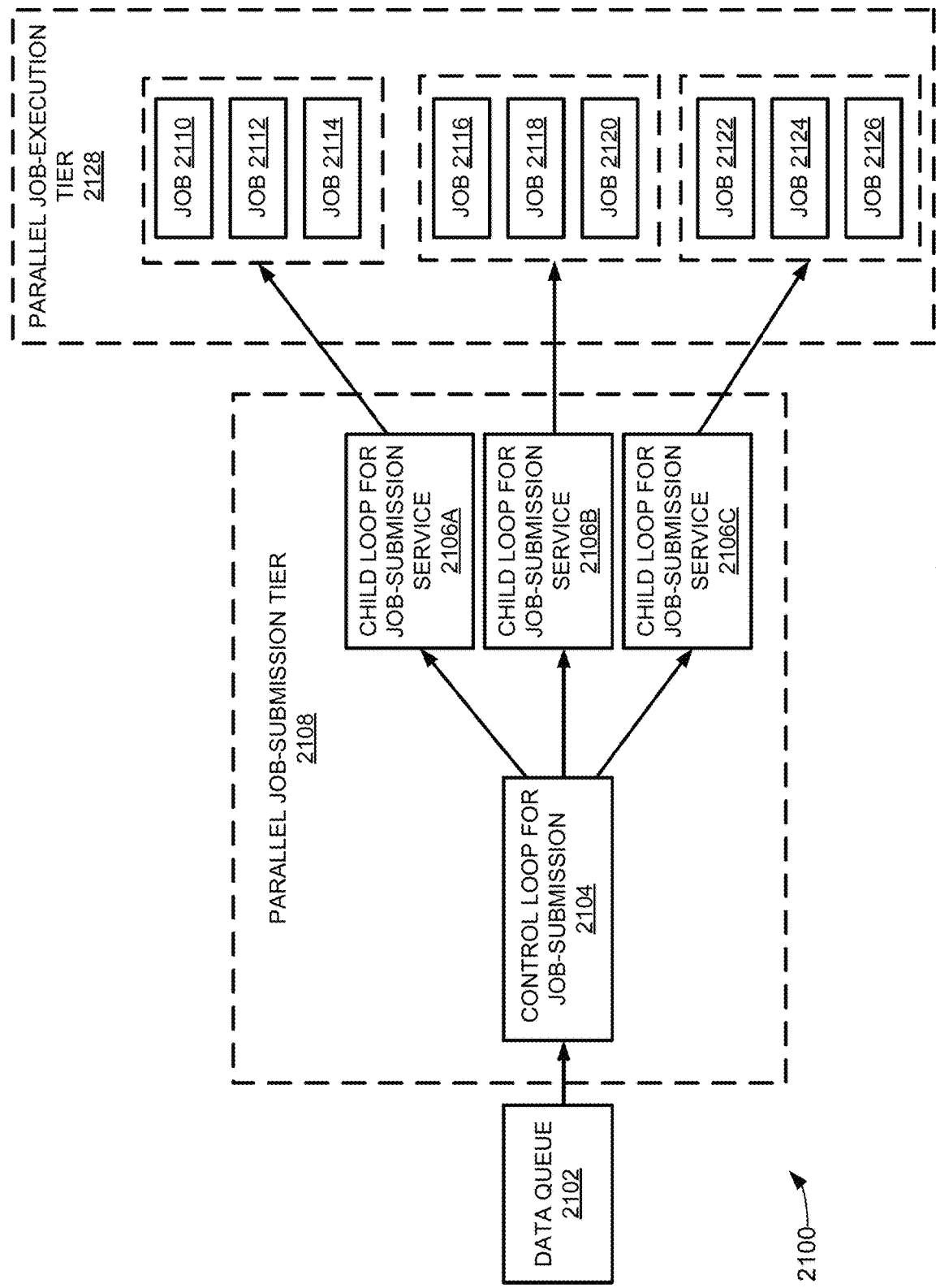
FIG. 21 is a block diagram of an example of a two-tier parallel process, according to some aspects.

FIG. 21 is a block diagram of an example of a two-tier parallel process 2100, according to some aspects. The two-tier parallel processing may be applied to submitting cataloging jobs, scanning jobs, searching jobs, and other jobs involved in the data protection process.

For a scanning process, the data queue 2102 is a scanning data queue. The scanning data queue includes a directory of files to be scanned. The scanning data queue can be processed in the two-tier parallel process, including parallel job-submission tier 2108 and parallel job-execution tier 2128. At parallel job-submission tier 2108, a control loop for job-submission 2104 is configured to generate a configurable number of parallel scanning-job-submission services for creating and submitting scanning jobs to scan the directory of files in the scanning data queue. Each parallel scanning-job-submission service can be considered a child loop of the control loop. Here, three child loops for job-submission service 2106A, 2106B, and 2106C are deployed in parallel to operate on the data queue 2102. Each job-submission service can retrieve a number of files from the data queue 2102 and create a number of scanning jobs. One scanning job may be designated to scan one particular file or multiple files. Each child loop for job-submission service 2106A, 2106B, and 2108C can be deployed in parallel to submit scanning jobs for execution. At parallel job-execution tier 2128, scanning jobs submitted to a job scheduler 1416 by each child loop for job-submission service can be executed in parallel.

For example, child loop for job-submission service 2106A can submit three scanning jobs 2110, 2112, and 2114 to the job scheduler 1614 for execution. The three scanning jobs 2110, 2112, and 2114 can be executed in parallel. Similarly, in parallel to child loop for job-submission service 2106A, child loop for job-submission service 2106B can submit three scanning jobs 2116, 2118, and 2120 to the job scheduler 1614 for execution. The scanning jobs 2116, 2118, and 2120 can be executed in parallel with each other and/or scanning jobs 2110, 2112, and 2114. Similarly, child loop for job-submission service 2106C can submit three scanning jobs 2122, 2124, and 2126 to the job scheduler 1614 for execution. The scanning jobs 2122, 2124, and 2126 can be executed in parallel to each other and/or the other scanning jobs. Although described here with respect to scanning jobs, a similar parallel process can be applied to cataloging, searching, and other processes. Thus, multiple configurable tiers of parallelism with scalability can be created to reduce overall execution time for scanning, as well as cataloging and searching and other processes.

Figure 22:
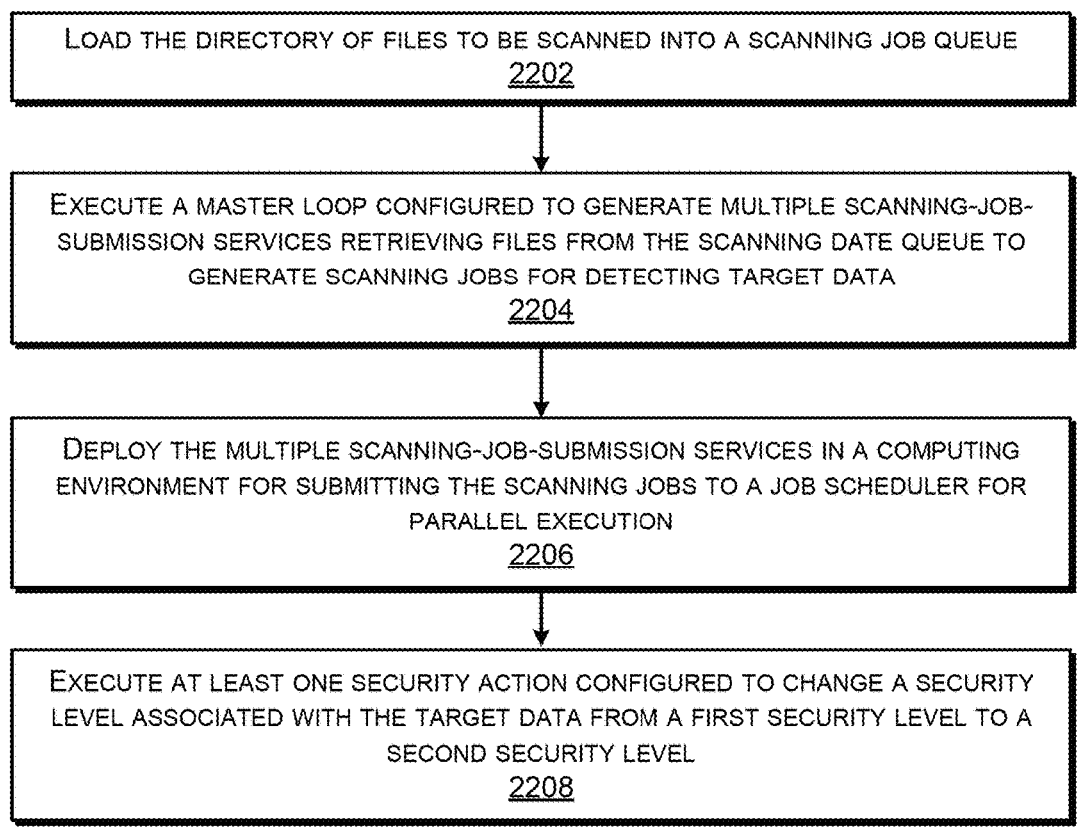
FIG. 22 is a flow chart of an example process for scanning a directory of files for target data and executing corresponding security actions, according to some aspects.

FIG. 22 is a flow chart of an example process 2200 for scanning a directory of files for target data and automatically executing corresponding security actions, according to some aspects. Some or all of the process may be implemented by the data protection server 1402. Other examples may involve more operations, fewer operations, different operations, or a different sequence of operations than is shown.

At block 2202, the data protection server 1402 loads the directory of files to be scanned into a scanning data queue. For example, the data protection server 1402 can include a scanning module 1408 configured for creating scanning jobs for the directory of files. The scanning module 1408, in turn, can include a queue generator 1602. The queue generator 1602 can load the directory of files to be scanned in the scanning data queue. In some examples, the scanning data queue is in the form of a table, and one file is loaded in each row of the table for scanning. The scanning data queue then includes an ordered list of files waiting to be scanned.

At block 2204, the data protection server 1402 executes a control loop configured to generate multiple scanning-job-submission services for retrieving files from the scanning data queue to generate scanning jobs for detecting target data. The number of the multiple parallel scanning-job-submission services is configurable based on a runtime parameter associated with a control loop. The job submission module 1604 can execute the control loop 1506, which in turn can generate a number of child loops, such as 1508A, 1508B, and 1508C, for scanning-job-submission services based on the configurable runtime parameter. The number of child loops can provide parallel scanning-job-submission services. Each parallel scanning-job-submission service is configured to retrieve a number of files from the directory of files to be scanned. Each parallel scanning-job-submission service can create a number of scanning jobs that are configured to scan the number of files retrieved by corresponding parallel scanning-job-submission service. In some examples, each scanning job is configured to scan one or more files for detecting target data. The client device 1438 may define what the target data is for a scanning process on the data protection server 1402. Alternatively, or additionally, the data protection server 1402 can determine the target data for scanning automatically based on a compliance request from the client device 1438. In some examples, the target data is PII data.

Figure 23:
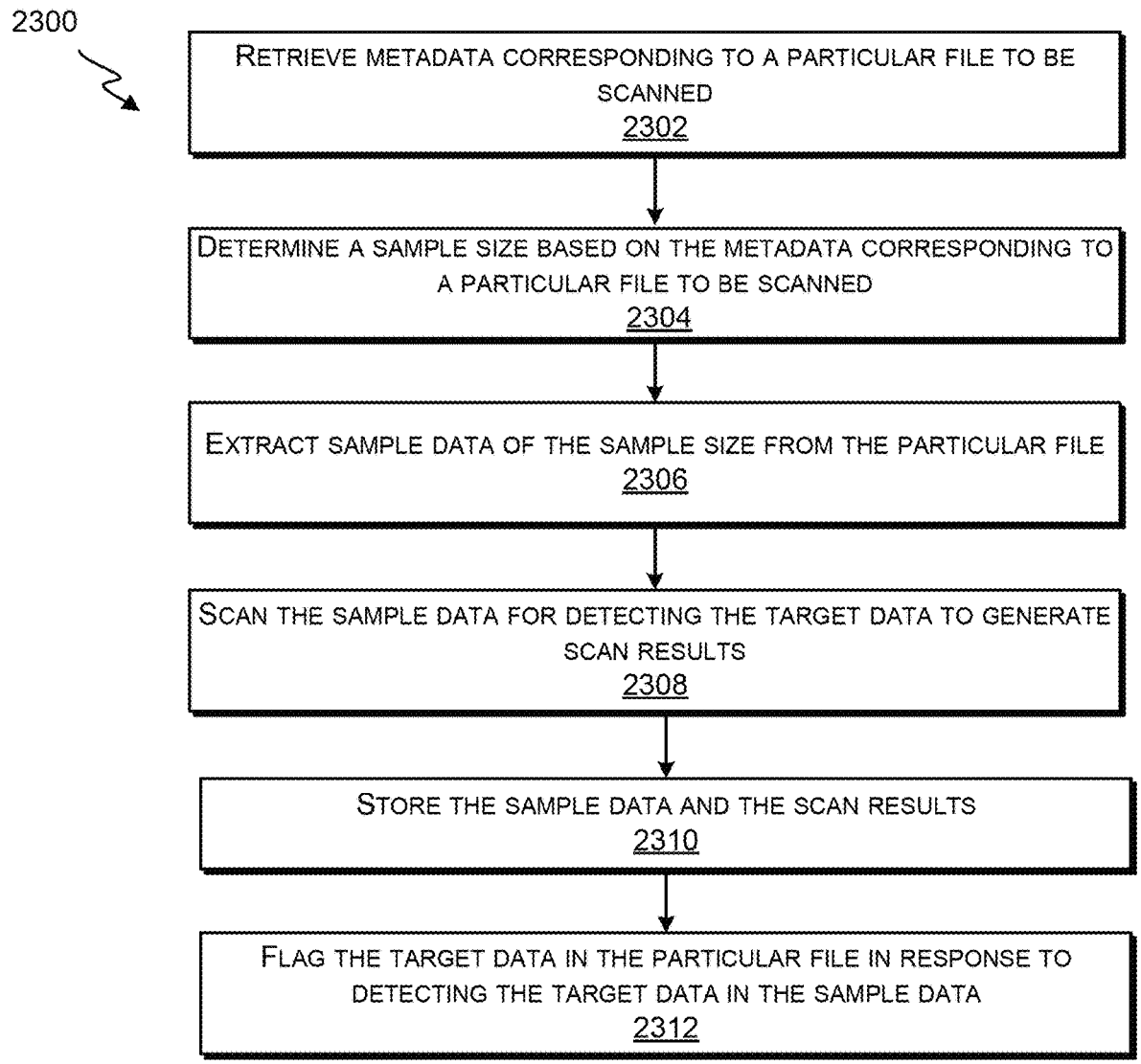
FIG. 23 is a flow chart of an example process for executing a scanning job submitted by a parallel scanning-job-submission service, according to some aspects.

At block 2206, the data protection server 1402 deploys the multiple scanning-job-submission services in a computing environment for submitting the scanning jobs to a job scheduler for parallel execution. Each parallel scanning-job-submission service can submit its respective scanning jobs in parallel to a job scheduler. In some examples, the job submission module 1604 deploys the number of scanning-job-submission services in parallel at one deployment. In some examples, the job submission module 1604 deploys some of the number of parallel scanning-job-submission services in parallel as a batch for one deployment, and then another batch of parallel scanning-job-submission services for another deployment. The job submission module 1604 is configured to coordinate with the job scheduler 1416 on the data protection server 1402 for submitting scanning jobs for parallel execution. FIG. 23, as described below, illustrates how a scanning job is executed for detecting the target data.

At block 2208, the data protection server 1402 executes at least one security action configured to change a security level associated with the target data from a first security level to a second security level. For example, the data protection server 1402 can classify the target data based on the categorization information (e.g., different group types of data) in the scan results 1426. If the target data is classified as having a sensitivity level that exceeds a threshold, the target data is considered to be sensitive data. A remediation action module 1904 of the remediation module 1412 can execute certain actions to increase a security level of the sensitive data. In some examples, the remediation action module 1904 can move a sensitive data table to a restricted folder, change access control to limit access to the sensitive data, delete the sensitive data, or delete certain information classified as secret from the sensitive data.

Now turning to FIG. 23, FIG. 23 is a flow chart of an example process 2300 for executing a scanning job submitted by a parallel scanning-job-submission service, according to some aspects. At block 2302, the data protection server 1402 retrieves metadata corresponding to a particular file to be scanned. The metadata corresponding to the particular file to be scanned can be a subset of the metadata 1422 about the directory of files which includes the particular file. The metadata 1422 about the directory of files can be extracted in a cataloging process prior to scanning. The metadata corresponding to the particular file can include table-level metadata, such as table names, table location, proprietorship, security information, table size, and column-level metadata, such as column name, column data type, and column length.

At block 2304, the data protection server 1402 determines a sample size based on the subset of the metadata. The sample size is an amount of data in the particular file to be scanned for detecting the target data. The sampling module 1606 is configured to determine a sample size based on the metadata about the particular file. In some examples, the sampling module 1606 can implement a statistical algorithm configured to determine the statistically significant number of rows to scan to be able to detect the target data and determine a group type for the target data. The statistical algorithm can adjust parameters, such as z-score, margin of error, and probability of class, based on the metadata of the particular file; and determine a sample size for scanning the particular file based on the adjusted parameter.

At block 2306, the data protection server 1402 extracts sample data of the sample size from the particular file. Once the sample size is determined, the sampling module 1606 can extract sample data 1424 of the sample size from the particular file. For example, the total number of data rows in the particular file is 10,000, the sample size is 1000, and the sample module 1606 can extract every 10th row in the particular file as sample data.

At block 2308, the data protection server 1402 scans the sample data 1424 for the target data to generate scan results 1426. Categorizing may be part of the scanning process. Scanning and categorizing can run in parallel. Scan code can be generated automatically for each scanning job to call a data quality routine to analyze the data within each column. A categorizing algorithm can use a combination of column metadata and actual column data values to determine a group type for each column. Definitions of the group types are configurable based on user-specific taxonomies. The categorizing algorithm can implement Chop Tables, Grammars, Vocabularies, Schemes and/or Regex to perform the categorization process. When the categorizing involves identification numbers, the categorizing algorithm can use a mod 10 algorithm for further verification of the group type. FIG. 24, as described below, illustrates a categorizing process for a column of data. The scan results 1426 can include categorization information (e.g., different group types) for the sample data.

At block 2310, the data protection server 1402 stores the sample data 1424 and the scan results 1426. The sample data 1424 and the scan results 1426 can be stored as part of a data module in the data store 1418.

At block 2312, the data protection server 1402 flags the target data in the particular file in response to detecting the target data in the sample data 1424. In some examples, the target data in the particular file can be flagged with the categorization information (e.g., group types) from the scan results 1426.

Each scanning job may take different amounts of time to execute. When the scanning jobs submitted by a particular parallel scanning-job-submission service are completed, the scanning process can exit the child loop for the particular scanning-job-submission service. When all of the child loops are completed, the scanning process can exit the control loop.

Now turning to FIG. 24, FIG. 24 is a flow chart of an example process 2400 for determining a group type for a column of the sample data, according to some aspects. At block 2402, the data protection server 1402 determines that data values in a column of the sample data are of a first type based on a name of the column. One or more worker nodes in the computing environment of the data protection server 1402 can execute the scan code to retrieve the name of the column from the metadata of a particular file where the column is located. The column name can indicate a data type of the data in the column.

At block 2404, the data protection server 1402 determines that the data values in the column are of a second type by analyzing the data values, the second type being different from the first type. One or more worker nodes in the computing environment of the data protection server 1402 can execute the scan code to scan the data values in the column to indicate another data type of the data in the column. The data type indicated by the data values of the column can be different from the data type indicated by the column name of the column.

At block 2406, the data protection server 1402 determines a conflict between the first type and the second type. When the data type indicated by the data values of the column is different from the data type indicated by the column name of the column, a conflict is detected. The one or more work nodes in the computing environment of the data protection server 1402 can apply an operation to resolve the conflict.

At block 2408, the data protection server 1402 applies an operation configured to resolve the conflict by selecting the first type or the second type as a group type for the column of the sample data. In some examples, the scan code may include a logic process for resolving the conflict. For example, the logic process may specify that when the data type indicated by the data values of the column is different from the data type indicated by the column name of the column, select the data type indicated by the data values as a group type for the data in the column. Alternatively, the logic process may specify that when the data type indicated by the data values of the column is different from the data type indicated by the column name of the column, select the data type indicated by the column name as a group type for data of the column. When the group types determined by the logic process are flagged as inaccurate during later process by the data protection server 1402 or by manual verification, the logical process needs to be updated. In some examples, a trained machine learning algorithm can be used to solve the conflict. The trained machine learning algorithm can be retrained and updated every certain time interval. The training data can be column names and data values in columns and the accurate group types of the columns.

At block 2410, the data protection server 1402 determines the data values in the column are of a third type by using a mod 10 algorithm. In some examples, the data values involve identification numbers, the categorization process can implement a mod 10 algorithm, such as a Luhn algorithm, to determine a data type for the column of data.

At block 2412, the data protection server 1402 determines another conflict between the third type and the group type. When the data type determined by the mod 10 algorithm is different from the group type determined at block 2408, another conflict is detected. The one or more work nodes in the computing environment of the data protection server 1402 can apply an operation to resolve the conflict.

At block 2414, the data protection server 1402 applies another operation configured to resolve the other conflict by selecting the third type as an update group type for the column of the sample data. The scan code may include another logic process for resolving the conflict. For example, the logic process determines that when the data type indicated by the mod 10 algorithm is different from the group type determined by the column name or the data values of the column, select the data type indicated by the mod 10 algorithm as the updated group type for the column of data.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system, comprising:
   one or more processors; and
   one or more memory devices including instructions that are executable by the one or more processors for causing the one or more processors to:

extract metadata for a directory of files;
load the directory of files to be scanned into a scanning data queue;
execute a control loop configured to generate a configurable number of scanning-job-submission services, the configurable number being based on a runtime parameter associated with the control loop, wherein each scanning-job-submission service is configured to retrieve a respective subset of files from the scanning data queue and generate a respective set of scanning jobs for scanning the respective subset of files; and
deploy the configurable number of scanning-job-submission services in parallel in a computing environment, wherein each scanning-job-submission service is configured to execute a respective child loop for submitting the respective set of scanning jobs to a job scheduler for parallel execution, the job scheduler being configured to orchestrate the parallel execution of the respective set of scanning jobs across one or more worker nodes of the computing environment, and wherein each scanning job is configured to scan a particular file of the respective subset of files retrieved by a corresponding scanning-job-submission service for detecting target data by:
retrieving a subset of the metadata corresponding to the particular file to be scanned;
determining a sample size based on the subset of the metadata corresponding to the particular file, the sample size being an amount of data to be extracted from the particular file and scanned for detecting the target data;
extracting sample data of the sample size from the particular file;
scanning the sample data for detecting the target data to generate scan results;
storing the sample data and the scan results; and
in response to detecting the target data in the sample data, flagging the target data in the particular file.

2. The system of claim 1, wherein the subset of the metadata about the particular file comprises a data location, a data proprietor, security information, a table name, a table size, a column name, a column data type, and a column length.

3. The system of claim 1, wherein the directory of files to be scanned is equally distributed to the configurable number of scanning-job-submission services based on a modulo (mod) algorithm.

4. The system of claim 1, wherein the one or more memory devices further include instructions that are executable by the one or more processors for causing the one or more processors to:
load multiple directories of files in a cataloging data queue;
execute another control loop configured to generate a configurable number of cataloging-job-submission services, wherein the configurable number being based on another runtime parameter associated with the other control loop, and wherein each cataloging-job-submission service is configured to retrieve a respective subset of directories of files from the cataloging data queue and generate a respective set of cataloging jobs for cataloging the respective subset of directories of files; and
deploy the configurable number of cataloging-job-submission services in parallel in the computing environment, wherein each cataloging-job-submission service is configured to generate a respective child loop for submitting the respective set of cataloging jobs to the job scheduler for parallel execution, and wherein each cataloging job is configured to extract a particular set of metadata about a particular directory of files of the respective subset of directories of files and catalog data in the particular directory of files based on the particular set of metadata.

5. The system of claim 1, wherein determining the sample size based on the subset of the metadata for the particular file comprises:
determining a plurality of values for a plurality of parameters of a sampling algorithm based on the metadata for a directory of files; and
determining the sample size by executing the sampling algorithm using the plurality of values for the plurality of parameters.

6. The system of claim 5, wherein the plurality of parameters comprises a z-score, a margin of error, and a probability of class.

7. The system of claim 1, wherein the one or more memory devices further includes instructions that are executable by the one or more processors for causing the one or more processors to:
generate a key value for each column of the sample data, thereby generating a plurality of key values; and
dynamically generate scan code to be executed by the respective set of scanning jobs based on a code template comprising a plurality of macro-variables, wherein a plurality of column macro-variables are generated based on the key values assigned to columns in the sample data to replace the plurality of macro-variables in the code template.

8. The system of claim 1, wherein the respective set of scanning jobs are configured to scan files that have not been previously scanned or that have changed since last scanning.

9. The system of claim 1, wherein the one or more memory devices further includes instructions that are executable by the one or more processors for causing the one or more processors to:
determine that data values in a column of the sample data are of a first type based on a name of the column;
determine that the data values in the column are of a second type by analyzing the data values, the second type being different from the first type;
determine a conflict between the first type and the second type; and
execute an operation configured to resolve the conflict by selecting either the first type or the second type as a chosen group type for the column of the sample data.

10. The system of claim 9, wherein the one or more memory devices further includes instructions that are executable by the one or more processors for causing the one or more processors to:
determine the data values in the column are of a third type by using a mod-10 algorithm;
determine another conflict between the third type and the chosen group type; and
execute another operation configured to resolve the other conflict by selecting the third type as an updated group type for the column of the sample data.

11. The system of claim 1, wherein scanning the sample data for detecting the target data to generate the scan results comprising grouping the target data into one or more data groups, wherein the target data is personal identifiable information, and wherein the scan results comprise one or more data groups.

12. The system of claim 11, wherein the one or more memory devices further includes instructions that are executable by the one or more processors for causing the one or more processors to:
- identify a plurality of data tables in the sample data based on a predetermined criterion and the scan results;
- load the plurality of data tables in a searching data queue;
- execute another control loop configured to generate a configurable number of searching-job-submission services, the configurable number being based on another runtime parameter associated with the other control loop, wherein each searching-job-submission service is configured to retrieve a respective subset of data tables from the searching data queue and generate a respective set of searching jobs for searching the respective subset of data tables; and
- deploy the configurable number of searching-job-submission services in parallel in the computing environment, wherein each searching-job-submission service is configured to generate a respective child loop for submitting the respective set of searching jobs to the job scheduler for parallel execution, and wherein each searching job is configured to search a particular data set of the respective subset of data tables.

13. The system of claim 1, wherein the one or more memory devices further includes instructions that are executable by the one or more processors for causing the one or more processors to:
- in response to detecting the target data in the sample data, execute at least one security action configured to change a security level associated with the target data from a first security level to a second security level.

14. The system of claim 13, wherein the at least one security action comprises moving a data file to a restricted folder, changing access controls to the data file, deleting the data file, or deleting column data containing sensitive values from a data table.

15. A method, comprising:
- extracting metadata for a directory of files;
- loading the directory of files to be scanned into a scanning data queue;
- executing a control loop configured to generate a configurable number of scanning-job-submission services, the configurable number being based on a runtime parameter associated with the control loop, wherein each scanning-job-submission service is configured to retrieve a respective subset of files from the scanning data queue and generate a respective set of scanning jobs for scanning the respective subset of files; and
- deploying the configurable number of scanning-job-submission services in parallel in a computing environment, wherein each scanning-job-submission service is configured to execute a respective child loop for submitting the respective set of scanning jobs to a job scheduler for parallel execution, the job scheduler being configured to orchestrate the parallel execution of the respective set of scanning jobs across one or more worker nodes of the computing environment, and wherein each scanning job is configured to scan a particular file of the respective subset of files retrieved by a corresponding scanning-job-submission service for detecting target data by:
  - retrieving a subset of the metadata corresponding to the particular file to be scanned;
  - determining a sample size based on the subset of the metadata for the particular file, the sample size being an amount of data to be extracted from the particular file and scanned for detecting the target data;
  - extracting sample data of the sample size from the particular file;
  - scanning the sample data for detecting the target data to generate scan results;
  - storing the sample data and the scan results; and
  - in response to detecting the target data in the sample data, flagging the target data in the particular file.

16. The method of claim 15, wherein the subset of the metadata about the particular file comprises a data location, a data proprietor, security information, a table name, a table size, a column name, a column data type, and a column length.

17. The method of claim 15, wherein the directory of files to be scanned is equally distributed to the configurable number of scanning-job-submission services based on a modulo (mod) algorithm.

18. The method of claim 15, further comprising:
- loading multiple directories of files in a cataloging data queue;
- executing another control loop configured to generate a configurable number of cataloging-job-submission services, wherein the configurable number being based on another runtime parameter associated with the other control loop, wherein each cataloging-job-submission service is configured to retrieve a respective subset of directories of files from the cataloging data queue and generate a respective set of cataloging jobs for cataloging the respective subset of directories of files; and
- deploying the configurable number of cataloging-job-submission services in parallel in the computing environment, wherein each cataloging-job-submission service is configured to generate a respective child loop for submitting the respective set of cataloging jobs to the job scheduler for parallel execution, and wherein each cataloging job is configured to extract a particular set of metadata about a particular directory of files of the respective subset of directories of files and catalog data in the particular directory of files based on the particular set of metadata.

19. The method of claim 15, wherein determining the sample size based on the subset of the metadata for the particular file comprises:
- determining a plurality of values for a plurality of parameters of a sampling algorithm based on the metadata for a directory of files, wherein the plurality of parameters comprises a z-score, a margin of error, and a probability of class; and
- determining the sample size by executing the sampling algorithm using the plurality of values for the plurality of parameters.

20. The method of claim 15, further comprising:
- generating a key value for each column of the sample data, thereby generating a plurality of key values; and
- dynamically generating scan code to be executed by the respective set of scanning jobs based on a code template comprising a plurality of macro-variables, wherein a plurality of column macro-variables are generated based on the key values assigned to columns in the sample data to replace the plurality of macro-variables in the code template.

21. The method of claim 15, further comprising:
- determining that data values in a column of the sample data are of a first type based on a name of the column;

determining that the data values in the column are of a second type by analyzing the data values, the second type being different from the first type;

determining a conflict between the first type and the second type;

executing an operation configured to resolve the conflict by selecting either the first type or the second type as a chosen group type for the column of the sample data;

determining the data values in the column are of a third type by using a mod-10 algorithm;

determining another conflict between the third type and the chosen group type; and executing another operation configured to resolve the other conflict by selecting the third type as an updated group type for the column of the sample data.

22. The method of claim 15, wherein the respective set of scanning jobs are configured to scan files that have not been previously scanned or that have changed since last scanning, wherein scanning the sample data for detecting the target data to generate scan results comprising grouping the target data into one or more data groups, wherein the target data is personal identifiable information, wherein the scan results comprise one or more data groups.

23. The method of claim 22, further comprising:

identifying a plurality of data tables in the sample data based on a predetermined criterion and the one or more data groups;

loading the plurality of data tables in a searching data queue;

executing another control loop configured to generate a configurable number of searching-job-submission services, the configurable number being based on another runtime parameter associated with the other control loop, wherein each searching-job-submission service is configured to retrieve a respective subset of data tables from the searching data queue and generate a respective set of searching jobs for searching the respective subset of data tables; and deploying the configurable number of searching-job-submission services in parallel in the computing environment, wherein each searching-job-submission service is configured to generate a respective child loop for submitting the respective set of searching jobs to the job scheduler for parallel execution, and wherein each searching job is configured to search a particular data set of the respective subset of data tables.

24. The method of claim 15, further comprising, in response to detecting the target data in the sample data, executing at least one security action configured to change a security level associated with the target data from a first security level to a second security level, wherein the at least one security action comprises moving a data file to a restricted folder, changing access controls to the data file, deleting the data file, or deleting column data containing sensitive values from a data table.

25. A non-transitory computer-readable medium comprising program code that is executable by one or more processors for causing the one or more processors to:

extract metadata for a directory of files;

load the directory of files to be scanned into a scanning data queue;

execute a control loop configured to generate a configurable number of scanning-job-submission services, the configurable number being based on a runtime parameter associated with the control loop, wherein each scanning-job-submission service is configured to retrieve a respective subset of files from the scanning data queue and generate a respective set of scanning jobs for scanning the respective subset of files; and deploy the configurable number of scanning-job-submission services in parallel in a computing environment, wherein each scanning-job-submission service is configured to execute a respective child loop for submitting the respective set of scanning jobs to a job scheduler for parallel execution, the job scheduler being configured to orchestrate the parallel execution of the respective set of scanning jobs across one or more worker nodes of the computing environment, and wherein each scanning job is configured to scan a particular file of the respective subset of files retrieved by a corresponding scanning-job-submission service for detecting target data by:

retrieving a subset of the metadata corresponding to the particular file to be scanned;

determining a sample size based on the subset of the metadata for the particular file, the sample size being an amount of data to be extracted from the particular file and scanned for detecting the target data;

extracting sample data of the sample size from the particular file;

scanning the sample data for detecting the target data to generate scan results;

storing the sample data and the scan results; and in response to detecting the target data in the sample data, flagging the target data in the particular file.

26. The non-transitory computer-readable medium of claim 25, further comprising program code that is executable by the one or more processors for causing the one or more processors to:

load multiple directories of files in a cataloging data queue;

execute another control loop configured to generate a configurable number of cataloging-job-submission services, wherein the configurable number being based on another runtime parameter associated with the other control loop, and wherein each cataloging-job-submission service is configured to retrieve a respective subset of directories of files from the cataloging data queue and generate a respective set of cataloging jobs for cataloging the respective subset of directories of files; and deploy the configurable number of cataloging-job-submission services in parallel in the computing environment, wherein each cataloging-job-submission service is configured to generate a respective child loop for submitting the respective set of cataloging jobs to the job scheduler for parallel execution, wherein each cataloging job is configured to extract a particular set of metadata about a particular directory of files of the respective subset of directories of files and catalog data in the particular directory of files based on the particular set of metadata, and wherein the particular set of metadata about the particular directory of files comprises a data location, a data proprietor, security information, a table name, a table size, a column name, a column data type, and a column length.

27. The non-transitory computer-readable medium of claim 25, wherein determining the sample size based on the subset of the metadata for the particular file comprises:

determining a plurality of values for a plurality of parameters of a sampling algorithm based on the metadata for a directory of files, wherein the plurality of parameters comprises a z-score, a margin of error, and a probability of class; and determining the sample size by executing the sampling algorithm using the plurality of values for the plurality of parameters; and wherein the non-transitory computer-readable medium further comprises program code that is executable by one or more processors for causing the one or more processors to:

generate a key value for each column of the sample data, thereby generating a plurality of key values; and dynamically generate scan code to be executed by the respective set of scanning jobs based on a code template comprising a plurality of macro-variables, wherein a plurality of column macro-variables are generated based on the key values assigned to columns in the sample data to replace the plurality of macro-variables in the code template.

28. The non-transitory computer-readable medium of claim 25, further comprising program code that is executable by the one or more processors for causing the one or more processors to:

determine that data values in a column of the sample data are of a first type based on a name of the column;

determine that the data values in the column are of a second type by analyzing the data values, the second type being different from the first type;

determine a conflict between the first type and the second type; and execute an operation configured to resolve the conflict by selecting either the first type or the second type as a chosen group type for the column of the sample data;

determine the data values in the column are of a third type by using a mod-10 algorithm;

determine another conflict between the third type and the chosen group type; and execute another operation configured to resolve the other conflict by selecting the third type as an updated group type for the column of the sample data.

29. The non-transitory computer-readable medium of claim 25, further comprising program code that is executable by the one or more processors for causing the one or more processors to:

identify a plurality of data tables in the sample data based on a predetermined criterion and the scan results;

load the plurality of data tables in a searching data queue;

execute another control loop configured to generate a configurable number of searching-job-submission services, the configurable number being based on another runtime parameter associated with the other control loop, wherein each searching-job-submission service is configured to retrieve a respective subset of data tables from the searching data queue and generate a respective set of searching jobs for searching the respective subset of data tables; and deploy the configurable number of searching-job-submission services in parallel in the computing environment, wherein each searching-job-submission service is configured to generate a respective child loop for submitting the respective set of searching jobs to the job scheduler for parallel execution, and wherein each searching job is configured to search a particular data set of the respective subset of data tables.

30. The non-transitory computer-readable medium of claim 25, further comprising program code that is executable by the one or more processors for causing the one or more processors to:

in response to detecting the target data in the sample data, execute at least one security action configured to change a security level associated with the target data from a first security level to a second security level, wherein the at least one security action comprises moving a data file to a restricted folder, changing access controls to the data file, deleting the data file, or deleting column data containing sensitive values from a data table.

* * * * *